United States Patent
Kunt et al.

(10) Patent No.: US 12,526,085 B2
(45) Date of Patent: Jan. 13, 2026

(54) METHODS FOR SELECTIVELY ENABLING AND DISABLING UL HARQ RETRANSMISSION IN NTN COMMUNICATIONS AND COMMUNICATION APPARATUS UTILIZING THE SAME

(71) Applicant: MediaTek Singapore Pte. Ltd., Singapore (SG)

(72) Inventors: Mehmet Kunt, Cambridge (GB); Abhishek Roy, San Jose, CA (US); Pradeep Jose, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 450 days.

(21) Appl. No.: 18/015,967

(22) PCT Filed: Jul. 19, 2021

(86) PCT No.: PCT/SG2021/050422
§ 371 (c)(1),
(2) Date: Jan. 13, 2023

(87) PCT Pub. No.: WO2022/019833
PCT Pub. Date: Jan. 27, 2022

(65) Prior Publication Data
US 2023/0261802 A1 Aug. 17, 2023

Related U.S. Application Data

(60) Provisional application No. 63/054,270, filed on Jul. 21, 2020.

(51) Int. Cl.
*H04L 1/1812* (2023.01)
*H04L 1/1822* (2023.01)

(52) U.S. Cl.
CPC .................. *H04L 1/1822* (2013.01)

(58) Field of Classification Search
CPC ................. H04L 1/1822; H04L 1/1812
See application file for complete search history.

(56) References Cited

U.S. PATENT DOCUMENTS

2019/0245657 A1* 8/2019 Lee .................. H04W 80/02
2022/0045803 A1* 2/2022 Lin .................. H04L 1/1822
(Continued)

FOREIGN PATENT DOCUMENTS

WO 2020/065530 A1 4/2020
WO 2020/089858 A1 5/2020
(Continued)

OTHER PUBLICATIONS

Nokia, Nokia Shanghai Bell, Discussion on LCP procedure for NTN, 3GPP TSG-RAN WG2 Meeting #107bis, R2-1913388, Chongqing, China, Oct. 14-18, 2019.
(Continued)

*Primary Examiner* — Kent Krueger
(74) *Attorney, Agent, or Firm* — Winston Hsu

(57) ABSTRACT

Methods for selectively enabling and disabling UL HARQ retransmission in NTN communications and communication apparatus utilizing the same. A method for selectively enabling and disabling uplink Hybrid Automatic Repeat request (HARQ) retransmission in Non-Terrestrial Network (NTN) communications includes: determining a set of logical channels that are allowed to transmit or a set of MAC CEs that are allowed to be transmitted using one or more specific uplink (UL) HARQ processes. The one or more specific UL HARQ processes include one or more UL HARQ processes for which the UL retransmission has been disabled, or one or more UL HARQ processes for which the UL retransmission has been enabled.

16 Claims, 19 Drawing Sheets

(56) References Cited

U.S. PATENT DOCUMENTS

2022/0158770 A1\* 5/2022 Hong .................... H04L 5/0091
2022/0240283 A1\* 7/2022 Hong .................... H04L 1/1896

FOREIGN PATENT DOCUMENTS

WO      2021/056354 A1    4/2021
WO      2021/128318 A1    7/2021

OTHER PUBLICATIONS

"International Search Report" mailed on Oct. 5, 2021 for International application No. PCT/SG2021/050422, International filing date:Jul. 19, 2021.

\* cited by examiner

Sequence for one HARQ process (PID) with two HARQ buffers: 1- Retransmission disabled, 2-Retransmission enabled UE      Network (gNB)

Start sending UL grants. Indicate HARQ buffer: Any

UL grant: New data = true
Use HARQ buffer 1. UCI: Retransmission enabled = false
UL grant: New data = true
Use HARQ buffer 2. UCI: Retransmission enabled = true
UL grant: New data = true
Use HARQ buffer 1. UCI: Retransmission enabled = false Place in HARQ buffer 1.
If decode success, pass to upper layers. If not, discard.
Place in HARQ buffer 2. Decode fail: Set new data = false
Place in HARQ buffer 1.
If decode success, pass to upper layers. If not, discard.

UL grant: New data = false
Use HARQ buffer 2. UCI: Retransmission enabled = true Decode success: set new data = true, indicate HARQ buffer:2

UL grant: New data = true
Use HARQ buffer 1. UCI: Retransmission enabled = false If decode success, pass to upper layers. If not, discard.

FIG. 17

METHODS FOR SELECTIVELY ENABLING AND DISABLING UL HARQ RETRANSMISSION IN NTN COMMUNICATIONS AND COMMUNICATION APPARATUS UTILIZING THE SAME

CROSS REFERENCE TO RELATED APPLICATION

This application claims the benefit of U.S. Provisional Application No. 63/054,270 filed Jul. 21, 2020, the entirety of which is incorporated by reference herein.

BACKGROUND OF THE INVENTION

1. Field of the Invention

The disclosure is generally related to mobile communications and, more particularly, to selectively enabling and disabling uplink (UL) Hybrid Automatic Repeat request (HARQ) retransmission for User Equipment (UE) in Non-Terrestrial Network (NTN) communications.

2. Description of the Prior Art

Unless otherwise indicated herein, approaches described in this section are not prior art to the claims listed below and are not admitted as prior art by inclusion in this section.

In wireless communications such as mobile communications under $3^{rd}$ Generation Partnership Project (3GPP) specifications, the round trip time is an important factor that needs to be considered since it is closely related to transmission delay. In non-terrestrial network (NTN) systems in which an NTN node, such as a satellite, is hundreds of kilometers above the surface of the Earth, the UE-to-Satellite round trip time (UE-Sat RTT) is significant, and is much higher than the UE-to-Base Station (e.g., gNB) round trip time (UE-BS RTT) in terrestrial networks. Thus, the round trip delay (RTD) for the UE in the NTN systems is much higher than that in the terrestrial New Radio (NR) network.

Typically in NR, there are 16 HARQ processes. To achieve the target throughput under such high RTD conditions in the NTN systems, the number of HARQ processes has to be increased to many times above 16. However, it is likely to incur a big overhead in UE.

In order to avoid the overhead, there is a need for a solution related to how to selectively enable and disable HARQ retransmission for UE in NTN communications.

SUMMARY OF THE INVENTION

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues. More specifically, various schemes proposed in the present disclosure pertain to selectively enabling and disabling uplink (UL) HARQ retransmission in NTN communications.

In one aspect accordance with an implementation of the present disclosure, a method for selectively enabling and disabling UL HARQ retransmission in NTN communications comprises: determining a set of logical channels that are allowed to transmit using one or more specific uplink (UL) HARQ processes, wherein the one or more specific UL HARQ processes comprise one or more UL HARQ processes for which the UL retransmission has been disabled or alternatively, one or more UL HARQ processes for which the UL retransmission has been enabled.

In another aspect accordance with an implementation of the present disclosure, a method for selectively enabling and disabling UL HARQ retransmission in NTN communications comprises: determining a set of Medium Access Control (MAC) Control Elements (CEs) that are allowed to be transmitted using one or more specific uplink (UL) HARQ processes, wherein the one or more specific UL HARQ processes comprise one or more UL HARQ processes for which the UL retransmission has been disabled, or one or more UL HARQ processes for which the UL retransmission has been enabled.

In yet another aspect accordance with an implementation of the present disclosure, a method for selectively enabling and disabling UL HARQ retransmission in NTN communications comprises: determining whether or not a transport block (TB) to be transmitted requires support for UL HARQ retransmission to obtain a determination result; and indicating the determination result in first Uplink Control Information (UCI) and providing the first UCI to a network apparatus.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT), Industrial Internet of Things (IIoT) and non-terrestrial network (NTN), the proposed concepts, schemes and any variation(s)/derivative(s) thereof may be implemented in, for and by other types of radio access technologies, networks and network topologies. Thus, the scope of the present disclosure is not limited to the examples described herein.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 17 illustrates an example message flow for requesting support for UL HARQ retransmission in UCI with two separate HARQ buffers in accordance with an implementation of the present disclosure.

DETAILED DESCRIPTION

Detailed embodiments and implementations of the claimed subject matters are disclosed herein. However, it shall be understood that the disclosed embodiments and implementations are merely illustrative of the claimed subject matters which may be embodied in various forms. The disclosure may, however, be embodied in many different forms and should not be construed as limited to the exemplary embodiments and implementations set forth herein. Rather, these exemplary embodiments and implementations are provided so that description of the disclosure is thorough and complete and will fully convey the scope of the disclosure to those skilled in the art. In the description below, details of well-known features and techniques may be omitted to avoid unnecessarily obscuring the presented embodiments and implementations.

Overview

Implementations in accordance with the disclosure relate to various techniques, methods, schemes and/or solutions pertaining to selectively enabling and disabling UL HARQ retransmission for UE in NTN communications. According to the disclosure, a number of possible solutions may be implemented separately or jointly. That is, although these possible solutions may be described below separately, two or more of these possible solutions may be implemented in one combination or another.

Figure 1:
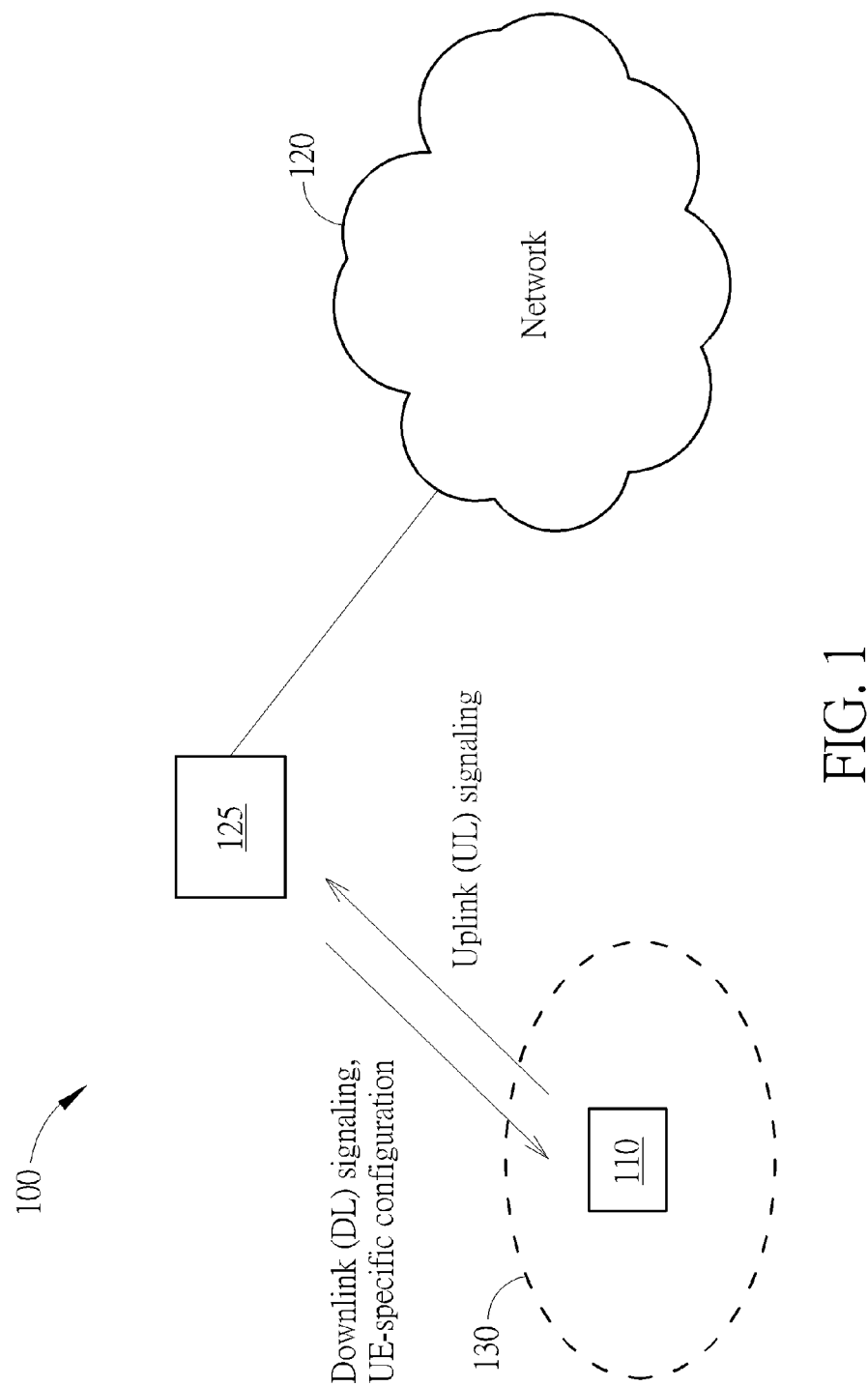
FIG. 1 illustrates an example network environment in which various proposed schemes in accordance with the present disclosure may be implemented.

FIG. 1 illustrates an example network environment 100 in which various proposed schemes in accordance with the present disclosure may be implemented. Network environment 100 may involve a UE 110 and a wireless network 120 (e.g., an LTE network, a 5G network, a NR network, an IoT network, an NB-IoT network, an IIoT network, an NTN network or any combination thereof). UE 110 may communicate with wireless network 120 via a network node 125. In some cases, network node 125 may be a non-terrestrial (NT) network node (e.g., a satellite) of an NTN. For these cases, the network node 125 may further communicate with a terrestrial network node (e.g., a base station (BS) such as a gNB, eNB or transmission/reception point (TRP)) in the wireless network 120, for relaying the wireless signals received from the UE 110 to the terrestrial network node or relaying the wireless signals received from the terrestrial network node to the UE 110. In some cases, network node 125 may be a terrestrial network node (e.g., a base station (BS) such as a gNB, eNB or transmission/reception point (TRP)). Each of UE 110 and network node 125 may be configured to perform operations pertaining to selectively enabling and disabling UL HARQ retransmission under various proposed schemes in accordance with the present disclosure, as described below.

Under a proposed scheme in accordance with the present disclosure, to allow selectively enabling and disabling UL HARQ retransmission for UE in NTN communications, a set of logical channels (LCHs) that are allowed to transmit using one or more specific uplink (UL) HARQ processes with retransmission enabled or disabled (or not allowed to transmit using one or more specific UL HARQ processes with retransmission disabled or enabled) or a set of Medium Access Control (MAC) Control Elements (CEs) that are allowed to be transmitted using one or more specific UL HARQ processes with retransmission enabled or disabled (or not allowed to be transmitted using one or more specific UL HARQ processes with retransmission disabled or enabled) may be determined, for instance, determined by a network node 125 and signaled to the UE 110. Alternatively, or additionally, UE 110 may dynamically request support for UL HARQ retransmission, for instance, by indicating the request in Uplink Control Information (UCI). Details of the proposed schemes are described in the following paragraphs.

Illustrative Implementations

Figure 2:
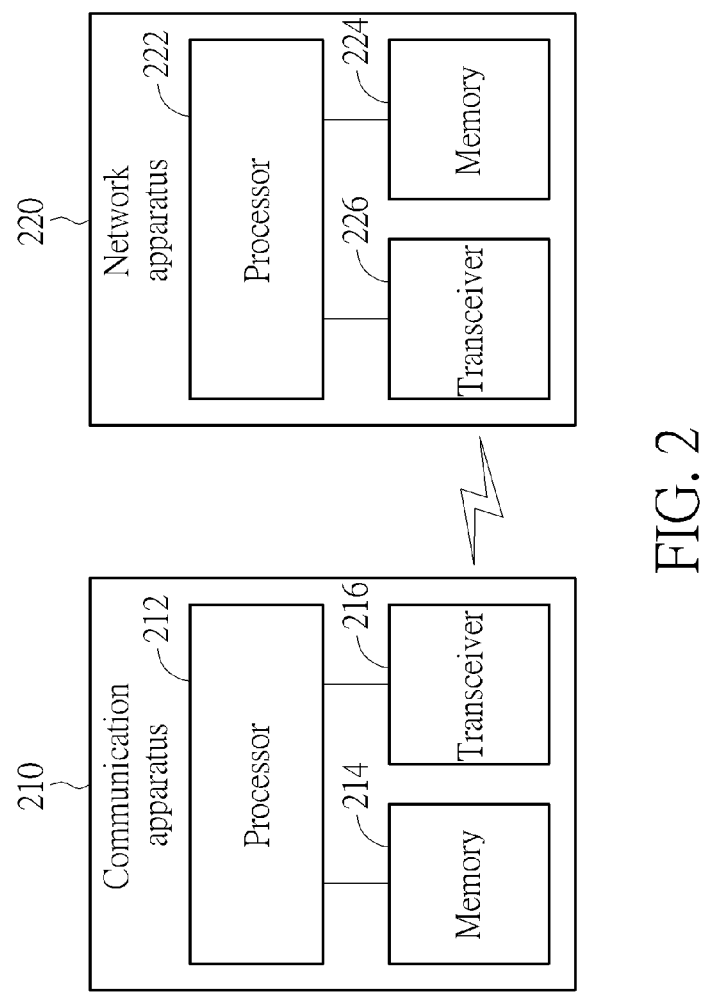
FIG. 2 illustrates an example communication apparatus and an example network apparatus in accordance with an implementation of the present disclosure.

FIG. 2 illustrates an example communication apparatus 210 and an example network apparatus 220 in accordance with an implementation of the present disclosure. Each of communication apparatus 210 and network apparatus 220 may perform various functions to implement schemes, techniques, processes and methods described herein pertaining to selectively enabling and disabling UL HARQ retransmission in NTN communications, including scenarios/schemes described above as well as the process described below.

Communication apparatus 210 may be a part of an electronic apparatus, which may be a UE such as a portable or mobile apparatus, a wearable apparatus, a wireless communication apparatus or a computing apparatus. For instance, communication apparatus 210 may be implemented in a smartphone, a smart watch, a personal digital assistant, a digital camera, or a computing equipment such as a tablet computer, a laptop computer or a notebook computer. Communication apparatus 210 may also be a part of a machine type apparatus, which may be an IoT, NB-IoT, IIoT or NTN apparatus such as an immobile or a stationary apparatus, a home apparatus, a wire communication apparatus or a computing apparatus. For instance, communication apparatus 210 may be implemented in a smart thermostat, a smart fridge, a smart door lock, a wireless speaker or a home control center. Alternatively, communication apparatus 210 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 210 may include at least some of those components shown in FIG. 2 such as a processor 212, for example. Communication apparatus 210 may further include one or more other components not pertinent to the proposed scheme of the present disclosure (e.g., internal power supply, display device and/or user interface device), and, thus, such component(s) of communication apparatus 210 are neither shown in FIG. 2 nor described below in the interest of simplicity and brevity.

Network apparatus 220 may be a part of an electronic apparatus/station, which may be a network node such as a base station, a small cell, a router, a gateway or a satellite. For instance, network apparatus 220 may be implemented in an eNB in an LTE, in a gNB in a 5G, NR, IoT, NB-IoT, IIoT, or in a satellite in an NTN network. Alternatively, network apparatus 220 may be implemented in the form of one or more IC chips such as, for example and without limitation, one or more single-core processors, one or more multi-core processors, or one or more RISC or CISC processors. Network apparatus 220 may include at least some of those components shown in FIG. 2 such as a processor 222, for example. Network apparatus 220 may further include one or more other components not pertinent to the proposed scheme of the present disclosure (e.g., internal power supply, display device and/or user interface device), and, thus, such component(s) of network apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including power consumption reduction, timing misalignment avoidance, . . . etc. in a device (e.g., as represented by communication apparatus 210) and a network (e.g., as represented by network apparatus 220) in accordance with various implementations of the present disclosure.

In some implementations, communication apparatus 210 may also include a transceiver 216 coupled to processor 212 and configured to transmit and receive wireless signals. In some implementations, communication apparatus 210 may further include a memory 214 coupled to processor 212 and capable of being accessed by processor 212 and storing data therein. In some implementations, network apparatus 220 may also include a transceiver 226 coupled to processor 222 and configured to transmit and receive wireless signals. In some implementations, network apparatus 220 may further include a memory 224 coupled to processor 222 and capable of being accessed by processor 222 and storing data therein. Accordingly, communication apparatus 210 and network apparatus 220 may wirelessly communicate with each other via transceiver 216 and transceiver 226, respectively.

Each of communication apparatus 210 and network apparatus 220 may be a communication entity capable of communicating with each other using various proposed schemes in accordance with the present disclosure. To aid better understanding, the following description of the operations, functionalities and capabilities of each of communication apparatus 210 and network apparatus 220 is provided in the context of a mobile communication environment in which communication apparatus 210 is implemented in or as a communication apparatus or a UE (e.g., UE 110) and network apparatus 220 is implemented in or as a network node (e.g., network node 125) or base station of a communication network (e.g., network 120). It is also noteworthy that, although the example implementations described below are provided in the context of NTN, the same may be implemented in other types of networks.

Under a proposed scheme pertaining to selectively enabling and disabling UL HARQ retransmission in NTN communications in accordance with the present disclosure, with communication apparatus 210 implemented in or as UE 110 and network apparatus 220 implemented in or as network node 125 in network environment 100, the processor 212 may establish, via transceiver 216, a wireless connection with network apparatus 220 as a network node (e.g., network node 125) of a wireless network (e.g., network 120) and may transmit, via transceiver 216, one or more uplink (UL) message or signaling to network apparatus 220. Additionally, network apparatus 220 may transmit, via transceiver 226, one or more downlink (DL) message or signaling to communication apparatus 210.

Disabling UL HARQ Retransmission

In the embodiments of the present disclosure, the network apparatus 220, such as the network node 125 in network environment 100, may disable UL HARQ retransmission for the communication apparatus 210, such as the UE 110 in network environment 100, to support long propagation delays. In some implementations, HARQ processes are still configured by the network apparatus 220 for the communication apparatus 210 even if UL HARQ retransmission is disabled. The enabling/disabling of UL HARQ retransmission is configurable per communication apparatus 210 and per HARQ process.

In one aspect accordance with an implementation of the present disclosure, as UL HARQ retransmission may be enabled for some HARQ processes and disabled for the remaining HARQ processes, new rules for Logical Channel Prioritization (LCP) procedure and Logical Channel (LCH) multiplexing and assembly are proposed. In another aspect accordance with an implementation of the present disclosure, new rules for Logical Channel Prioritization (LCP) restriction for MAC CEs are proposed. In yet another aspect accordance with an implementation of the present disclosure, new rules for dynamically requesting support for UL HARQ retransmission are proposed.

LCH Restrictions for HARQ in NTN

In the embodiments of the present disclosure, a mapping between LCHs and HARQ processes may exist. A set of LCHs may be restricted to transmit only on UL HARQ processes with retransmission enabled or disabled, or may be not allowed to transmit on UL HARQ processes with retransmission disabled or enabled.

In the embodiments of the present disclosure, the set of LCHs may be identified by LCH identity (LCID), a type of radio bearer data (e.g. data from Signaling Radio Bearer (SRB) or Data Radio Bearer (DRB)), or the Radio Link Control (RLC) mode of operations. In an implementation, data from SRBs may only be transmitted on UL HARQ processes with UL HARQ retransmission enabled. In another implementation, RLC Acknowledged Mode (AM) bearers may transmit on UL HARQ processes with retransmission disabled, and vice versa. RLC has three different modes of operations, including Unacknowledged Mode (UM), Transparent Mode (TM) and AM. Each mode can transmit and receive data and serve different logical channels.

In the embodiments of the present disclosure, the set of LCHs that are allowed (or not allowed) to transmit data using one or more UL HARQ processes with retransmission disabled or enabled may be determined by one or a combination of the following methods:

(a-1) Fixed in the specifications: for example, a rule of that SRB data may only be transmitted using UL HARQ processes with retransmission enabled may be specified in the specifications;

(a-2) Based on RLC mode of operations: for example, RLC-AM bearers may be allowed to use UL HARQ processes with retransmission disabled, whereas RLC-Unacknowledged Mode (UM) and RLC-Transparent Mode (TM) bearers may be not allowed to use UL HARQ processes with retransmission disabled.

In the embodiments of the present disclosure, the set of LCHs that are allowed (or not allowed) to transmit data using one or more UL HARQ processes with retransmission disabled or enabled may be configured by RRC signalling or indicated by a DL MAC CE. For example, whether a LCH is allowed/not allowed to transmit on UL HARQ processes with retransmission disabled/enabled is indicated by RRC configuration, or the set of HARQ processes (or, HARQ process identities (PIDs)) that a LCH is allowed/not allowed to transmit on may be indicated by RRC configuration. For another example, the set of LCHs that are allowed/not allowed to transmit on UL HARQ processes with retransmission disabled/enabled may be indicated by a specific DL MAC CE, which may be an existing or a newly introduced DL MAC CE.

Figure 3:
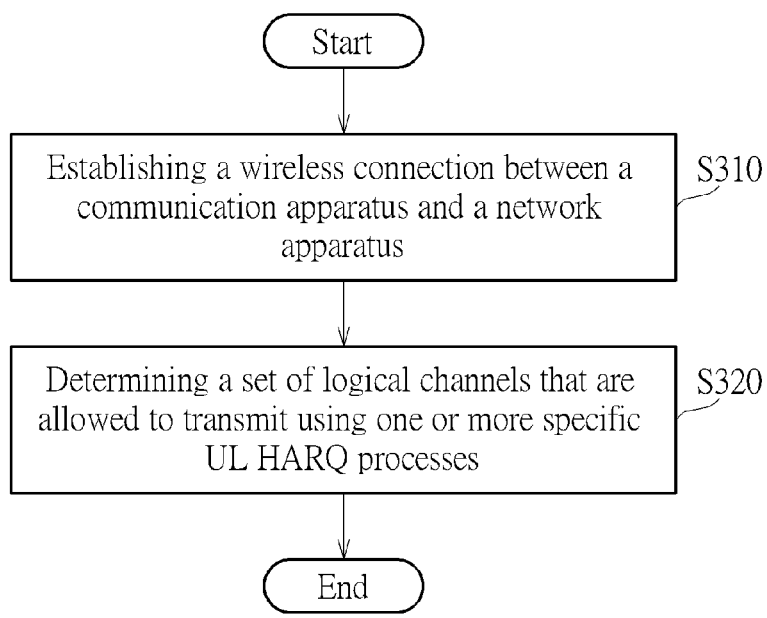
FIG. 3 illustrates an example process of a method for selectively enabling and disabling UL HARQ retransmission in NTN communications in accordance with an implementation in a first aspect of the present disclosure.

FIG. 3 illustrates an example process of a method for selectively enabling and disabling UL HARQ retransmission in NTN communications in accordance with an implementation in a first aspect of the present disclosure. The process may be an example implementation of schemes described above, whether partially or completely, with respect to selectively enabling and disabling UL HARQ retransmission in NTN communications in accordance with the present disclosure. The process may represent an aspect of implementation of features of communication apparatus 210. The process may include one or more operations, actions, or functions as illustrated by one or more of steps S310 and S320. Although illustrated as discrete steps, various steps of the process may be divided into additional steps, combined into fewer steps, or eliminated, depending on the desired implementation. Moreover, the steps of the process may be executed in the order shown in FIG. 3 or, alternatively, in a different order. The process may be implemented by communication apparatus 210 or any suitable UE or machine type devices, or implemented by network apparatus 220 or any suitable network node. Solely for illustrative purposes and without limitation, the process is described below in the context of communication apparatus 210 and network apparatus 220. The process may begin at step S310.

Step S310: establishing a wireless connection between the communication apparatus 210 and the network apparatus 220. In an embodiment of the present disclosure, the processor 212 of communication apparatus 210 may establish a wireless connection with network apparatus 220, such as a network node (e.g., network node 125) of a wireless network (e.g., network 120), and vice versa.

Step S320: determining a set of logical channels (LCHs) that are allowed to transmit using one or more specific UL HARQ processes. In an embodiment of the present disclosure, the one or more specific UL HARQ processes comprise one or more UL HARQ processes for which the UL retransmission has been disabled, or one or more UL HARQ processes for which the UL retransmission has been enabled.

In an embodiment of the present disclosure, the determination in step S320 may be performed by the processor 222 of network apparatus 220 based on RLC mode of operations or a type of radio bearer data, or one or a combination of the methods (a-1) and (a-2) as introduced above. When the determination is performed by the processor 222 of network apparatus 220, the processor 222 may further provide a configuration of the set of LCHs that are allowed to transmit using one or more specific UL HARQ processes to the communication apparatus 210 by RRC signaling or by MAC CE.

In another embodiment of the present disclosure, the determination in step S320 may be performed by the processor 212 of communication apparatus 210 based on a configuration (such as RRC configuration) provided by the network apparatus 220 via RRC signaling or via DL MAC CE as described above. When the set of LCHs that are allowed to transmit using one or more specific UL HARQ processes is determined, the processor 212 of communication apparatus 210 may further use at least one of the one or more specific UL HARQ processes to transmit UL data when the UL data arrives for at least one logical channel in the aforementioned set of LCHs.

In the embodiments of the present disclosure, mapping between LCHs and HARQ processes may be done by providing a mapping between LCHs and allowed HARQ processes (or PIDs); or indicating, for example, by a configuration (such as RRC configuration) which LCHs are allowed/not allowed to transmit on UL HARQ processes with retransmission disabled/enabled, and indicating, for example, by a separate configuration.

Figure 4:
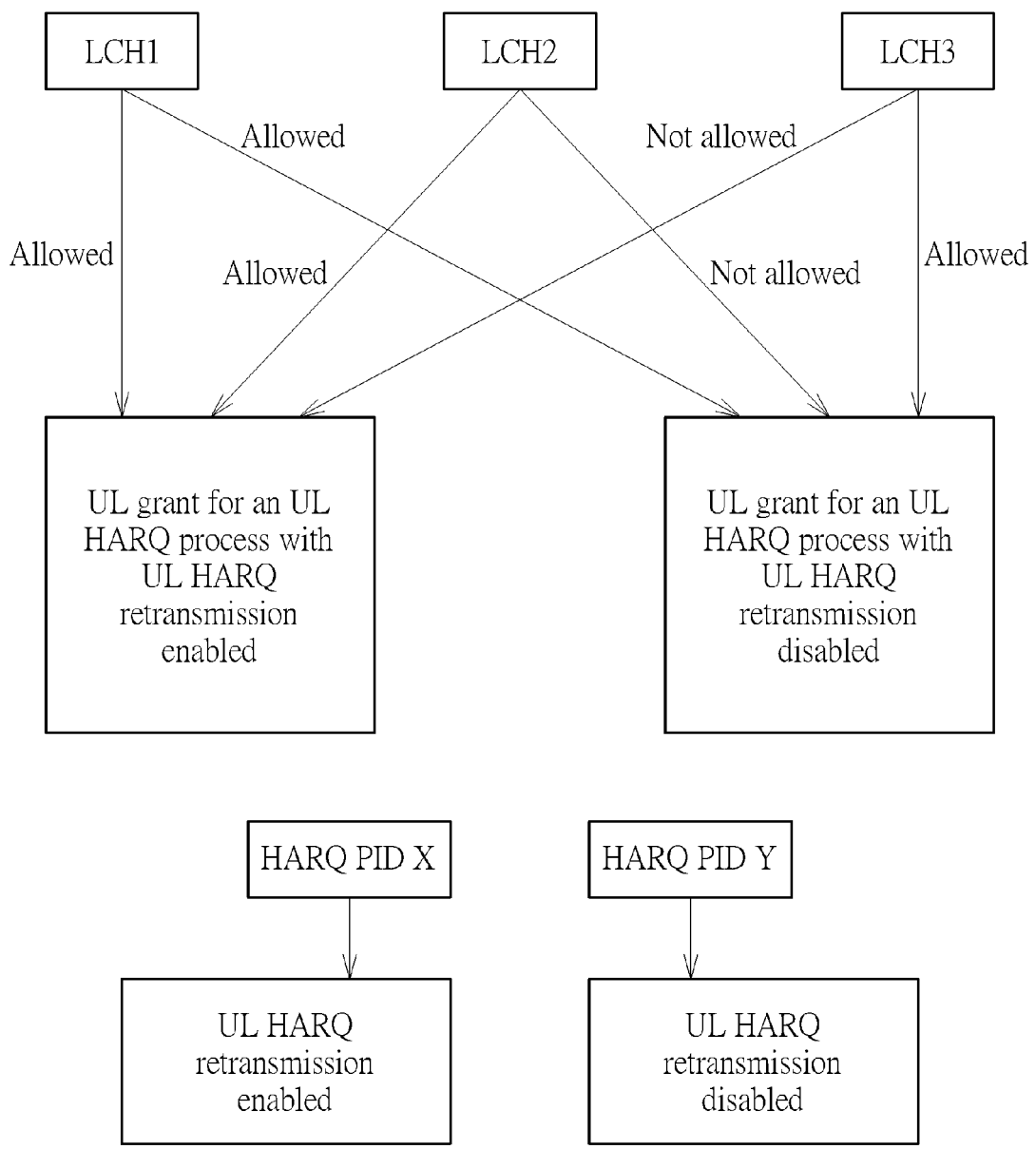
FIG. 4 illustrates an example mapping between LCHs and HARQ processes in accordance with an implementation in the first aspect of the present disclosure.

FIG. 4 illustrates an example mapping between LCHs and HARQ processes in accordance with an implementation in the first aspect of the present disclosure. In this implementation, mapping between LCHs and HARQ PIDs is implicit based on retransmission enabled/disabled attribute. As shown in FIG. 4, LCH1 is allowed to transmit its uplink data on the UL grant for an UL HARQ process with UL HARQ retransmission enabled, and is also allowed to transmit its uplink data on the UL grant for an UL HARQ process with UL HARQ retransmission disabled Similarly, LCH2 is allowed to transmit its uplink data on the UL grant for an UL HARQ process with UL HARQ retransmission enabled and is not allowed to transmit its uplink data on the UL grant for an UL HARQ process with UL HARQ retransmission disabled, and LCH3 is not allowed to transmit its uplink data on the UL grant for an UL HARQ process with UL HARQ retransmission enabled and is allowed to transmit its uplink data on the UL grant for an UL HARQ process with UL HARQ retransmission disabled. The HARQ process with HARQ PID X is UL HARQ retransmission enabled and the HARQ process with HARQ PID Y is UL HARQ retransmission disabled.

Figure 5:
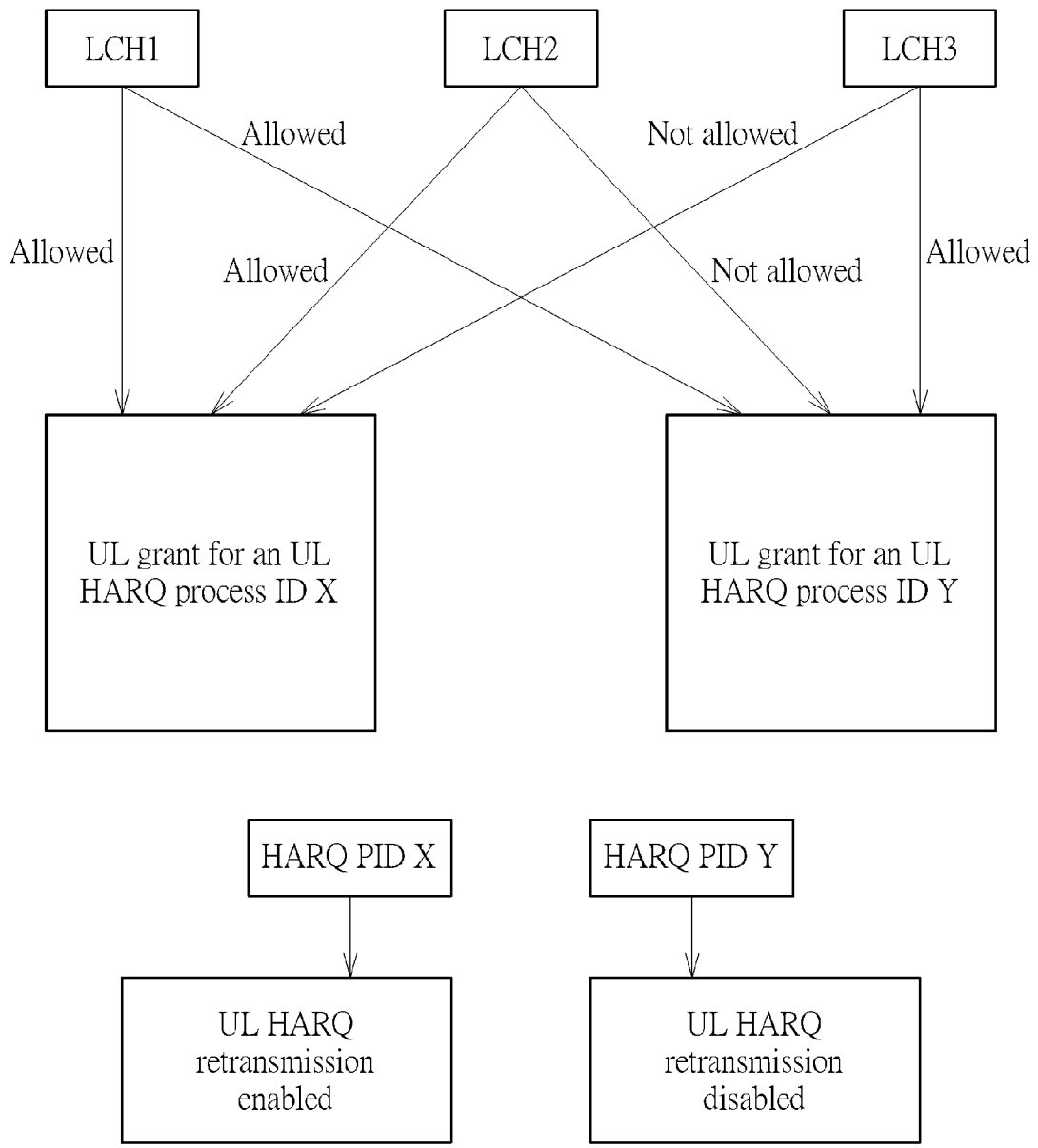
FIG. 5 illustrates another example mapping between LCHs and HARQ processes in accordance with an implementation in the first aspect of the present disclosure.

FIG. 5 illustrates another example mapping between LCHs and HARQ processes in accordance with an implementation in the first aspect of the present disclosure. In this implementation, mapping between LCHs and HARQ PIDs is explicit. As shown in FIG. 5, LCH1 is allowed to transmit its uplink data on the UL grant for the HARQ process with HARQ PID X, and is also allowed to transmit its uplink data on the UL grant for the HARQ process with HARQ PID Y. Similarly, LCH2 is allowed to transmit its uplink data on the UL grant for the HARQ process with HARQ PID X and is not allowed to transmit its uplink data on the UL grant for the HARQ process with HARQ PID Y, and LCH3 is not allowed to transmit its uplink data on the UL grant for the HARQ process with HARQ PID X and is allowed to transmit its uplink data on the UL grant for the HARQ process with HARQ PID Y. The HARQ process with HARQ PID X is UL HARQ retransmission enabled and the HARQ process with HARQ PID Y is UL HARQ retransmission disabled.

In an embodiment of the present disclosure, a list of allowed HARQ process ID, e.g. allowedHARQProcessId-List, may be maintained by the communication apparatus 210 as a LCH mapping restriction for NR-NTN enabled communication apparatuses. This restriction (e.g. the LCH restriction, or may also be regarded as HARQ process restriction) defines the set of allowed HARQ process identities for transmission, that is, the identities corresponding to the set of HARQ processes that are allowed for transmitting data from an LCH. When a new UL transmission is performed, the MAC entity of the communication apparatus 210 may select the logical channels for each UL grant that satisfy the following condition: "the set of allowed HARQ process identities in allowedHARQProcessId-List for the corresponding logical channels, if configured, includes the identity of the HARQ process associated to the UL grant".

In an embodiment of the present disclosure, when data from a LCH with HARQ process restriction is pending for transmission, and if there is no UL grant for any allowed UL HARQ process, the processor 212 of communication apparatus 210 may transmit a Scheduling Request (SR) to request UL resources from the network. In an implementation, a specific SR configuration may be utilized to request an UL grant for a specific HARQ process satisfying the LCH restriction(s).

Figure 6:
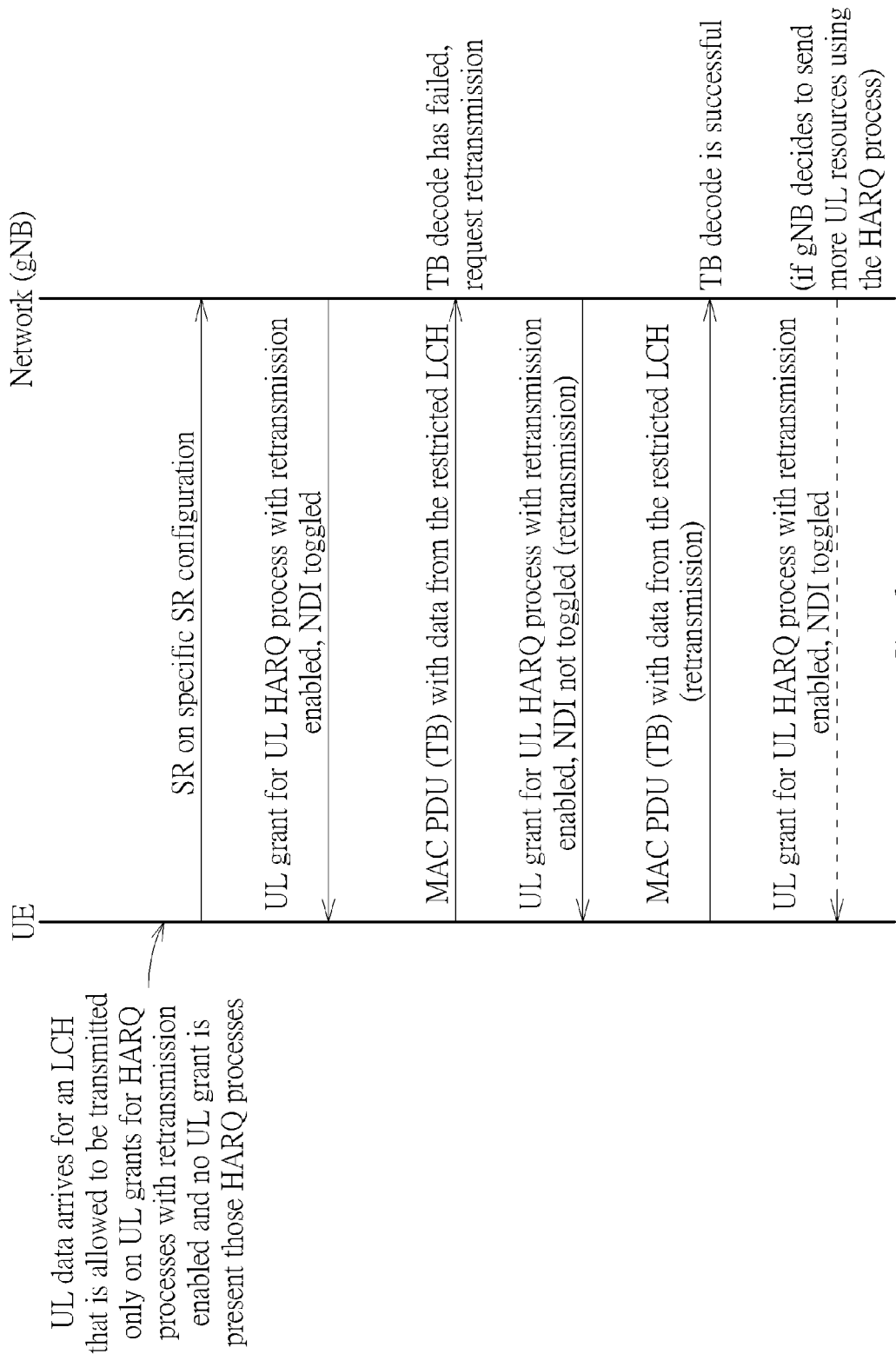
FIG. 6 illustrates an example message flow for triggering SR when no UL grant is present for a HARQ process with UL HARQ retransmission enabled in accordance with an implementation of the present disclosure.

FIG. 6 illustrates an example message flow for triggering SR when no UL grant is present for a HARQ process with UL HARQ retransmission enabled in accordance with an implementation of the present disclosure. When UL data arrives for an LCH that is allowed to be transmitted only on UL grants for HARQ processes with retransmission enabled and no UL grant for those HARQ processes is present, the processor 212 of communication apparatus 210 may transmit the SR on a specific SR configuration that is linked to the LCH (e.g. the restricted LCH) to the network apparatus 220, such as a gNB, in the network. In response to the SR, the network apparatus 220 may transmit an UL grant for the UL HARQ process with retransmission enabled accompanying with a new data indicator (NDI) toggled.

In response to the UL grant, the MAC layer protocol data unit (PDU) (e.g. a transport block (TB)) with data from the restricted LCH is transmitted by communication apparatus 210 to the network apparatus 220. Suppose that the TB decode has failed in gNB, retransmission is requested by the network apparatus 220 and the network apparatus 220 may transmit an UL grant for the UL HARQ process with retransmission enabled accompanying with the NDI not toggled (which means retransmission).

In response to the UL grant, the MAC layer PDU (TB) with data from the restricted LCH is retransmitted by communication apparatus 210 to the network apparatus 220. Suppose that the TB decode for the retransmission is successful, the network apparatus 220 may transmit an UL grant for the UL HARQ process with retransmission enabled accompanying with an NDI toggled if the network apparatus 220 decides to send more UL resources using the HARQ process.

In an embodiment of the present disclosure, when the SR cannot be sent (e.g. no SR configuration), the communication apparatus 210 may initiate a RACH and send a Buffer Status Report (BSR) MAC CE or data from the restricted LCH in Msg3 (UL HARQ retransmission is expected to be always enabled for Msg3) or MsgA (MsgA can be retransmitted if MsgB is not successfully received within MsgB-ResponseWindow).

Figure 7:
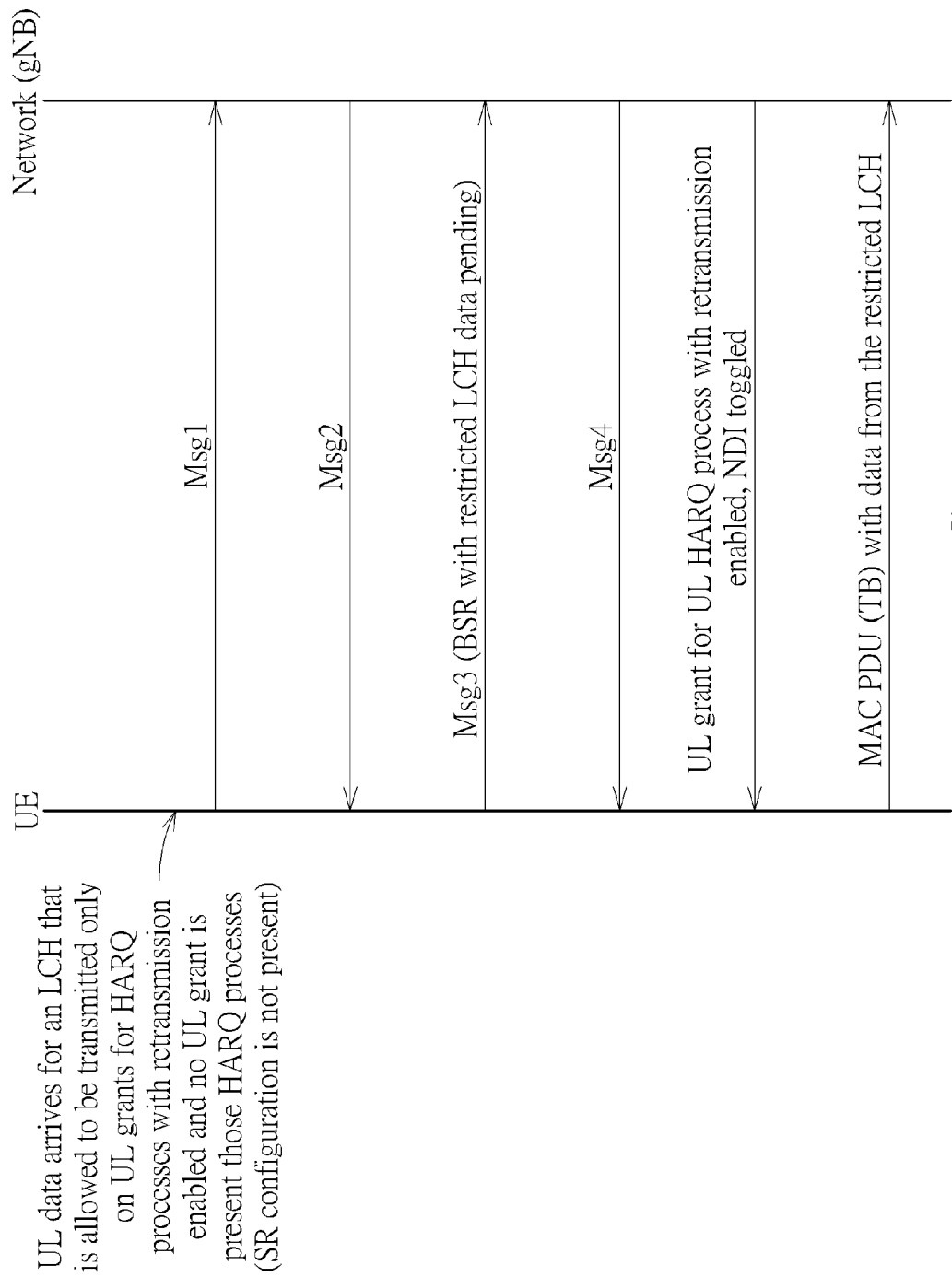
FIG. 7 illustrates an example message flow for triggering 4-step RA when no UL grant is present for a HARQ process with UL HARQ retransmission enabled in accordance with an implementation of the present disclosure.

FIG. 7 illustrates an example message flow for triggering 4-step random access (RA) when no UL grant is present for a HARQ process with UL HARQ retransmission enabled in accordance with an implementation of the present disclosure. When UL data arrives for an LCH that is allowed to be transmitted only on UL grants for HARQ processes with retransmission enabled and no UL grant for those HARQ processes is present and SR configuration is also not present, the communication apparatus 210 may transmit BSR with restricted LCH data pending in message 3 (Msg3) in the 4-step RA. In response to the Msg3 with BSR, the network apparatus 220 may transmit an UL grant for the UL HARQ process with retransmission enabled accompanying with an NDI toggled. In response to the UL grant, the MAC layer PDU (TB) with data from the restricted LCH is retransmitted by communication apparatus 210 to the network apparatus 220.

Figure 8:
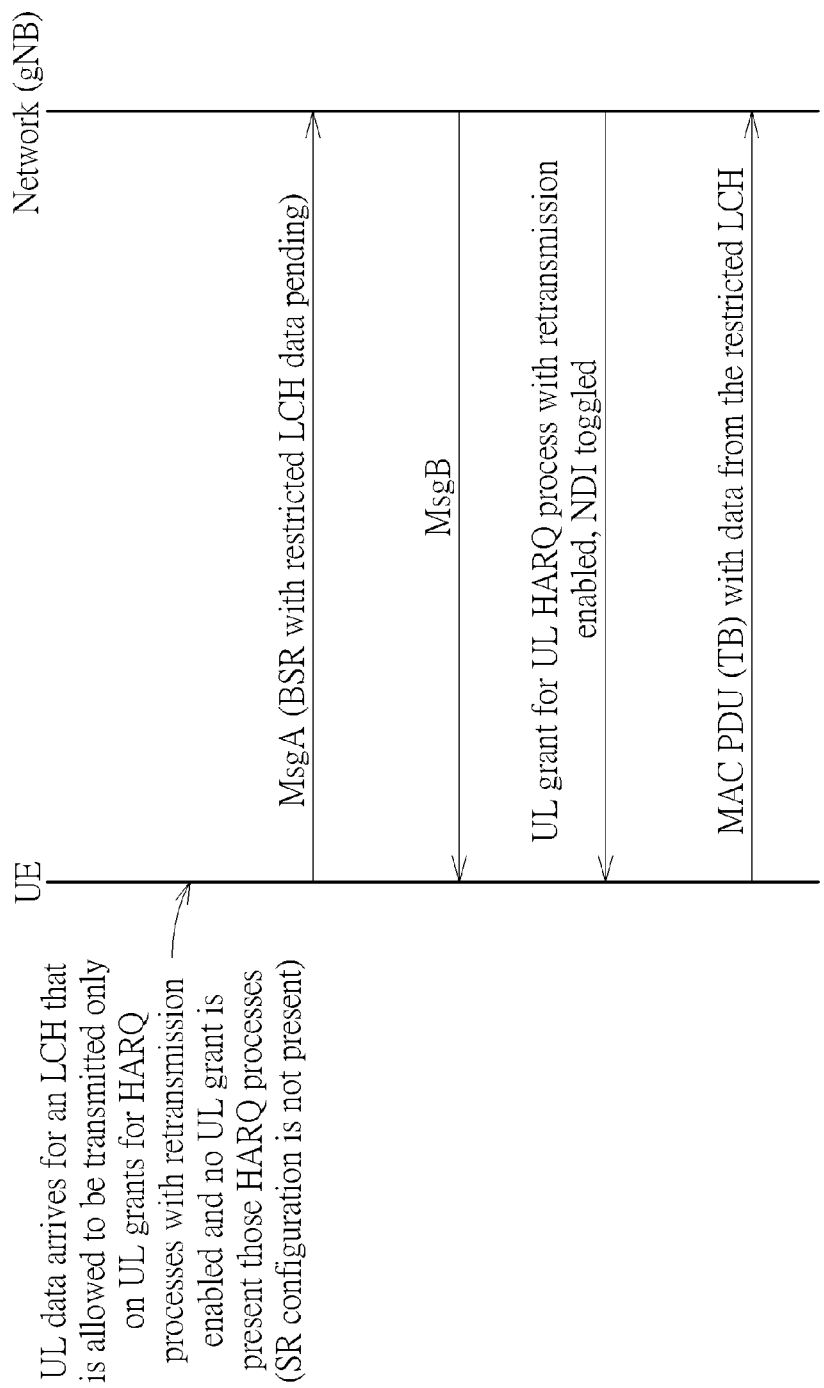
FIG. 8 illustrates an example message flow for triggering 2-step RA when no UL grant is present for a HARQ process with UL HARQ retransmission enabled in accordance with an implementation of the present disclosure.

FIG. 8 illustrates an example message flow for triggering 2-step RA when no UL grant is present for a HARQ process with UL HARQ retransmission enabled in accordance with an implementation of the present disclosure. When UL data arrives for an LCH that is allowed to be transmitted only on UL grants for HARQ processes with retransmission enabled and no UL grant for those HARQ processes is present and SR configuration is also not present, the communication apparatus 210 may transmit BSR with restricted LCH data pending in message A (MsgA) in the 2-step RA. In response to the MsgA with BSR, the network apparatus 220 may transmit an UL grant for the UL HARQ process with retransmission enabled accompanying with an NDI toggled.

In response to the UL grant, the MAC layer PDU (TB) with data from the restricted LCH is retransmitted by communication apparatus 210 to the network apparatus 220.

LCP Restrictions for MAC CEs in NTN

As MAC CEs are special MAC structures carrying control information, these may be handled differently from SRB/DRB data. With UL retransmission enabled and disabled selectively for some HARQ processes, MAC CEs may need special treatment. If the communication apparatus 210 has at least one UL HARQ process with retransmission enabled, the communication apparatus 210 may perform transmissions and retransmissions of a TB that includes MAC CEs using that HARQ process. In the second aspect accordance with an implementation of the present disclosure, new rules for Logical Channel Prioritization (LCP) restriction for MAC CEs are proposed.

In the embodiments of the present disclosure, a mapping between MAC CEs and HARQ processes may exist. A set of MAC CEs may be restricted as being allowed to be transmitted using UL HARQ processes with retransmission enabled or disabled, or not allowed to be transmitted on UL HARQ processes with retransmission disabled or enabled.

In the embodiments of the present disclosure, the set of UL HARQ processes (or PIDs) for which retransmission is enabled or disabled may be configured. For example, retransmission is enabled for UL HARQ PIP=X and disabled for HARQ PID=Y. Separately, the set of MAC CEs that are allowed/not allowed to be transmitted using UL HARQ processes with retransmission disabled may be configured. Or, the set of MAC CEs that are only allowed to be transmitted using UL HARQ processes with retransmission enabled may be configured. Alternatively, a set of HARQ processes (PIDs) that a MAC CE is allowed/not allowed to be transmitted on may be configured.

The set of MAC CEs that are allowed/not allowed to be transmitted using UL HARQ processes with retransmission disabled may comprise, for example, all MAC CEs, a subset of MAC CEs (for example, only high priority MAC CEs, or MAC CEs with priority higher than data from any LCH, except data from UL-Common Control Channel (CCCH), or MAC CEs other than BSR for padding or Side Link (SL)-BSR for padding, etc.).

In the embodiments of the present disclosure, the set of MAC CEs or the set of HARQ processes could be determined by, for example, fixed in the specifications, configured by RRC signalling and/or indicated by a DL MAC CE, which may be an existing or a newly introduced DL MAC CE.

Figure 9:
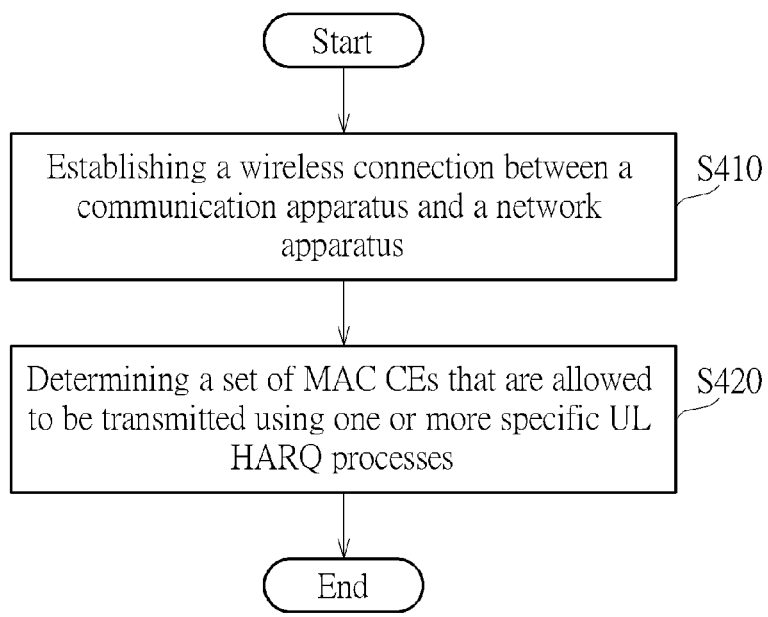
FIG. 9 illustrates an example process of a method for selectively enabling and disabling UL HARQ retransmission in NTN communications in accordance with an implementation in a second aspect of the present disclosure.

FIG. 9 illustrates an example process of a method for selectively enabling and disabling UL HARQ retransmission in NTN communications in accordance with an implementation in a second aspect of the present disclosure. The process may be an example implementation of schemes described above, whether partially or completely, with respect to selectively enabling and disabling UL HARQ retransmission in NTN communications in accordance with the present disclosure. The process may represent an aspect of implementation of features of communication apparatus 210. The process may include one or more operations, actions, or functions as illustrated by one or more of steps S410 and S420. Although illustrated as discrete steps, various steps of the process may be divided into additional steps, combined into fewer steps, or eliminated, depending on the desired implementation. Moreover, the steps of the process may be executed in the order shown in FIG. 9 or, alternatively, in a different order. The process may be implemented by communication apparatus 210 or any suitable UE or machine type devices, or implemented by network apparatus 220 or any suitable network node. Solely for illustrative purposes and without limitation, the process is described below in the context of communication apparatus 210 and network apparatus 220. The process may begin at step S410.

Step S410: establishing a wireless connection between the communication apparatus 210 and the network apparatus 220. In an embodiment of the present disclosure, the processor 212 of communication apparatus 210 may establish a wireless connection with network apparatus 220, such as a network node (e.g., network node 125) of a wireless network (e.g., network 120), and vice versa.

Step S420: determining a set of MAC CEs that are allowed to be transmitted using one or more specific UL HARQ processes. In an embodiment of the present disclosure, the one or more specific UL HARQ processes comprise one or more UL HARQ processes for which the UL retransmission has been disabled, or one or more UL HARQ processes for which the UL retransmission has been enabled.

In an embodiment of the present disclosure, the determination in step S420 may be performed by the processor 222 of network apparatus 220 based on priorities of the MAC CEs, or the set of MAC CEs or the determination rules for determining the set of MAC CEs may be fixed in the specifications. When the determination is performed by the processor 222 of network apparatus 220, the processor 222 may further provide a configuration of the set of MAC CEs that are allowed to be transmitted using one or more specific UL HARQ processes to the communication apparatus 210 by RRC signaling or by specific MAC CE.

In another embodiment of the present disclosure, the determination in step S420 may be performed by the processor 212 of communication apparatus 210 based on a configuration (such as RRC configuration) provided by the network apparatus 220 via RRC signaling or via DL MAC CE. When the set of MAC CEs that are allowed to be transmitted using one or more specific UL HARQ processes is determined and when a transport block (TB) with a MAC CE belonging to the set of MAC CEs is to be transmitted, the processor 212 of communication apparatus 210 may further use at least one of the one or more specific UL HARQ processes to transmit the TB.

In the embodiments of the present disclosure, mapping between MAC CEs and HARQ processes may be done by providing a mapping between MAC CEs and allowed HARQ processes (or PIDs); or indicating, for example by a configuration (such as RRC configuration) which MAC CEs are allowed/not allowed to transmit on UL HARQ processes with retransmission disabled/enabled, and indicating, for example by a separate configuration.

Figure 10:
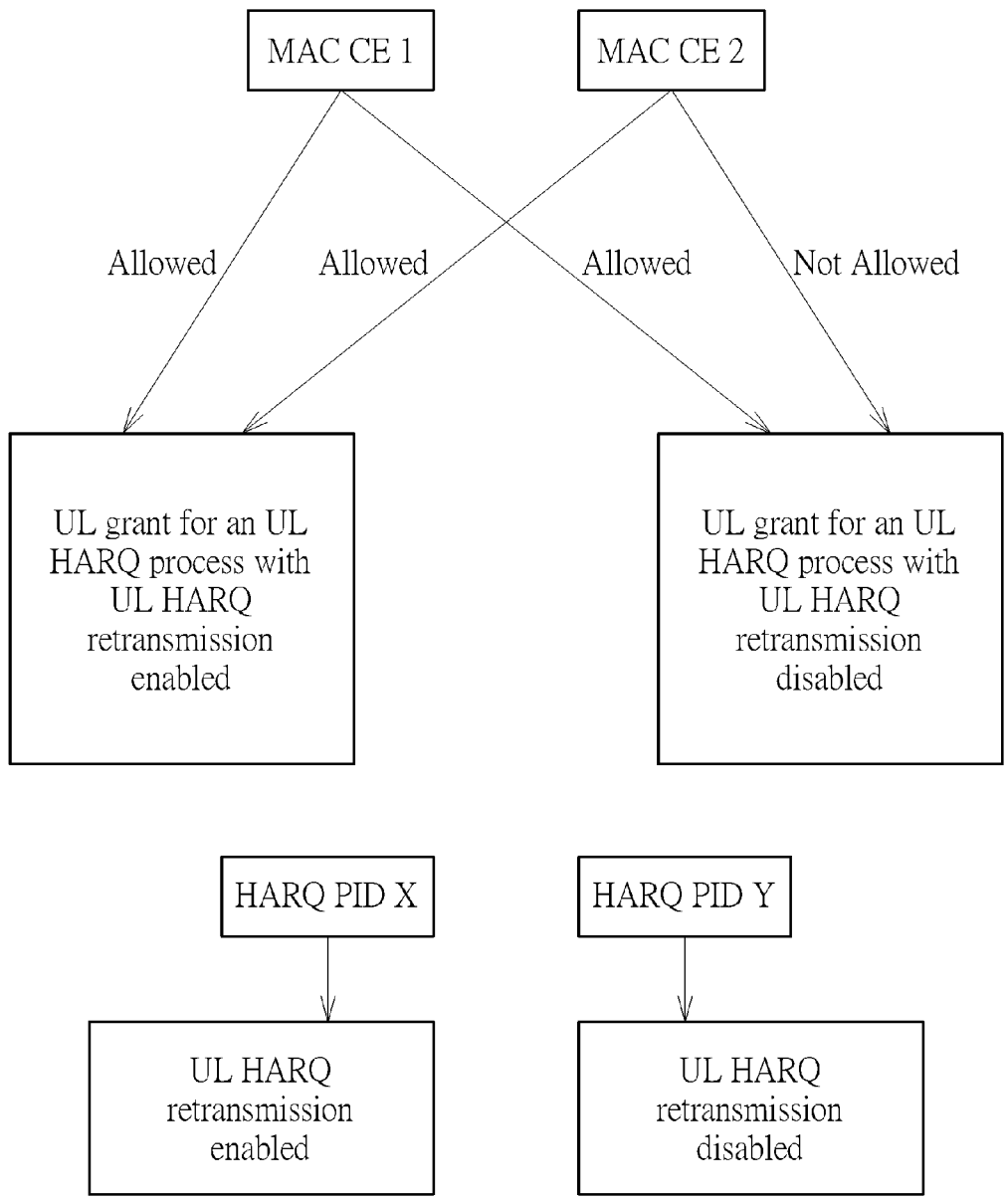
FIG. 10 illustrates an example mapping between MAC CEs and HARQ processes in accordance with an implementation in the second aspect of the present disclosure.

FIG. 10 illustrates an example mapping between MAC CEs and HARQ processes in accordance with an implementation in the second aspect of the present disclosure. In this implementation, mapping between MAC CEs and HARQ PIDs is implicit based on retransmission enabled/disabled attribute. As shown in FIG. 10, MAC CE 1 is allowed to be transmitted on the UL grant for an UL HARQ process with UL HARQ retransmission enabled, and is also allowed to be transmitted on the UL grant for an UL HARQ process with UL HARQ retransmission disabled. Similarly, MAC CE 2 is allowed to be transmitted on the UL grant for an UL HARQ process with UL HARQ retransmission enabled and is not allowed to be transmitted on the UL grant for an UL HARQ process with UL HARQ retransmission disabled. The HARQ process with HARQ PID X is UL HARQ retransmission enabled and the HARQ process with HARQ PID Y is UL HARQ retransmission disabled.

Figure 11:
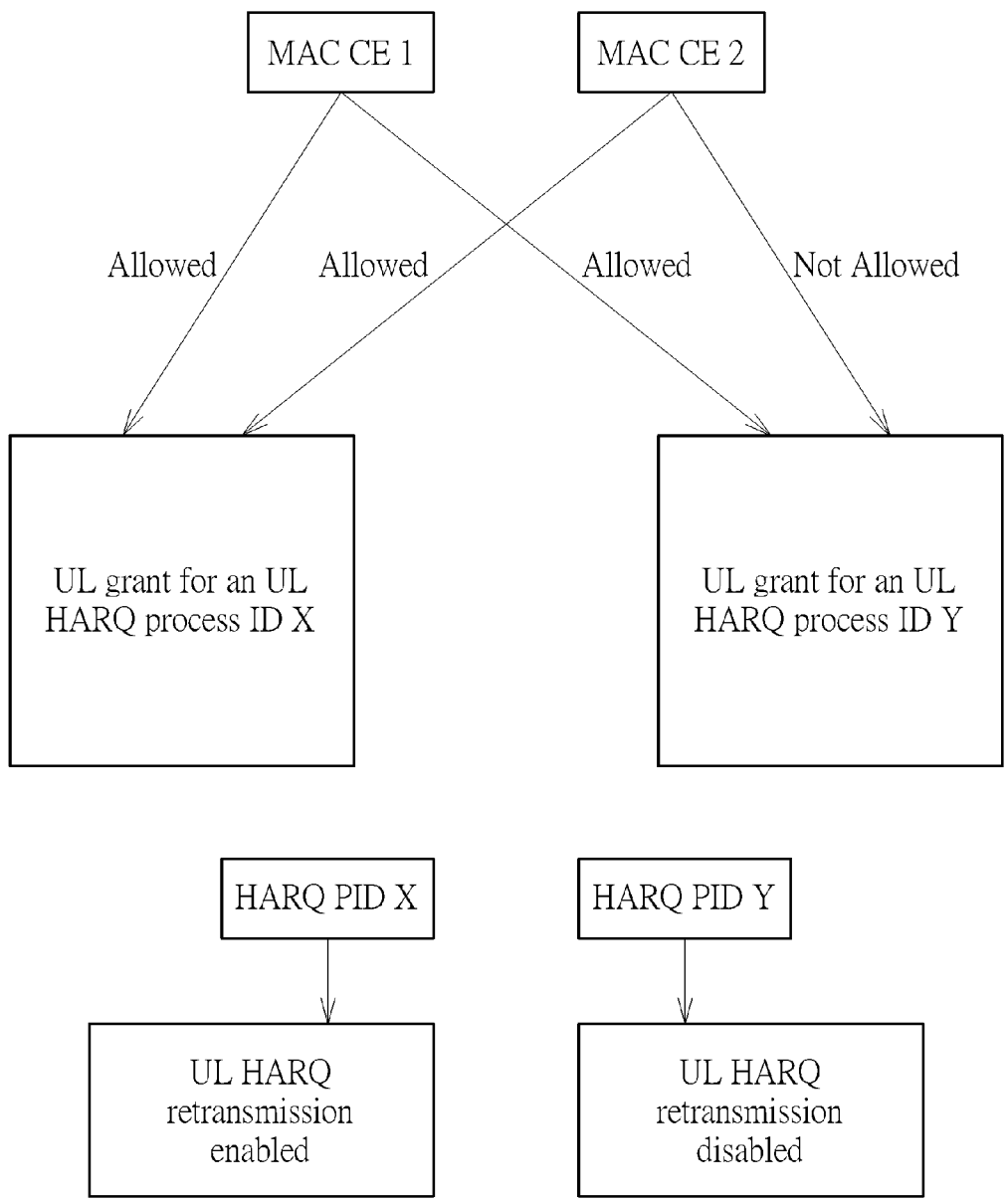
FIG. 11 illustrates another example mapping between MAC CEs and HARQ processes in accordance with an implementation in the second aspect of the present disclosure.

FIG. 11 illustrates another example mapping between MAC CEs and HARQ processes in accordance with an implementation in the second aspect of the present disclosure. In this implementation, mapping between MAC CEs and HARQ PIDs is explicit. As shown in FIG. 11, MAC CE 1 is allowed to be transmitted on the UL grant for the HARQ process with HARQ PID X, and is also allowed to be transmitted on the UL grant for the HARQ process with HARQ PID Y. Similarly, MAC CE 2 is allowed to be transmitted on the UL grant for the HARQ process with HARQ PID X and is not allowed to be transmitted on the UL grant for the HARQ process with HARQ PID Y. The HARQ process with HARQ PID X is UL HARQ retransmission enabled and the HARQ process with HARQ PID Y is UL HARQ retransmission disabled.

In an embodiment of the present disclosure, when a MAC CE has been generated (i.e. pending transmission) in the communication apparatus 210 that needs to be transmitted using a specific UL HARQ process, and if no UL grant for any corresponding UL HARQ process(es) is present, the processor 212 of communication apparatus 210 may transmit a Scheduling Request (SR) to request UL resources from the network. In an implementation, a specific SR configuration may be utilized to request an UL grant for a specific HARQ process.

Figure 12:
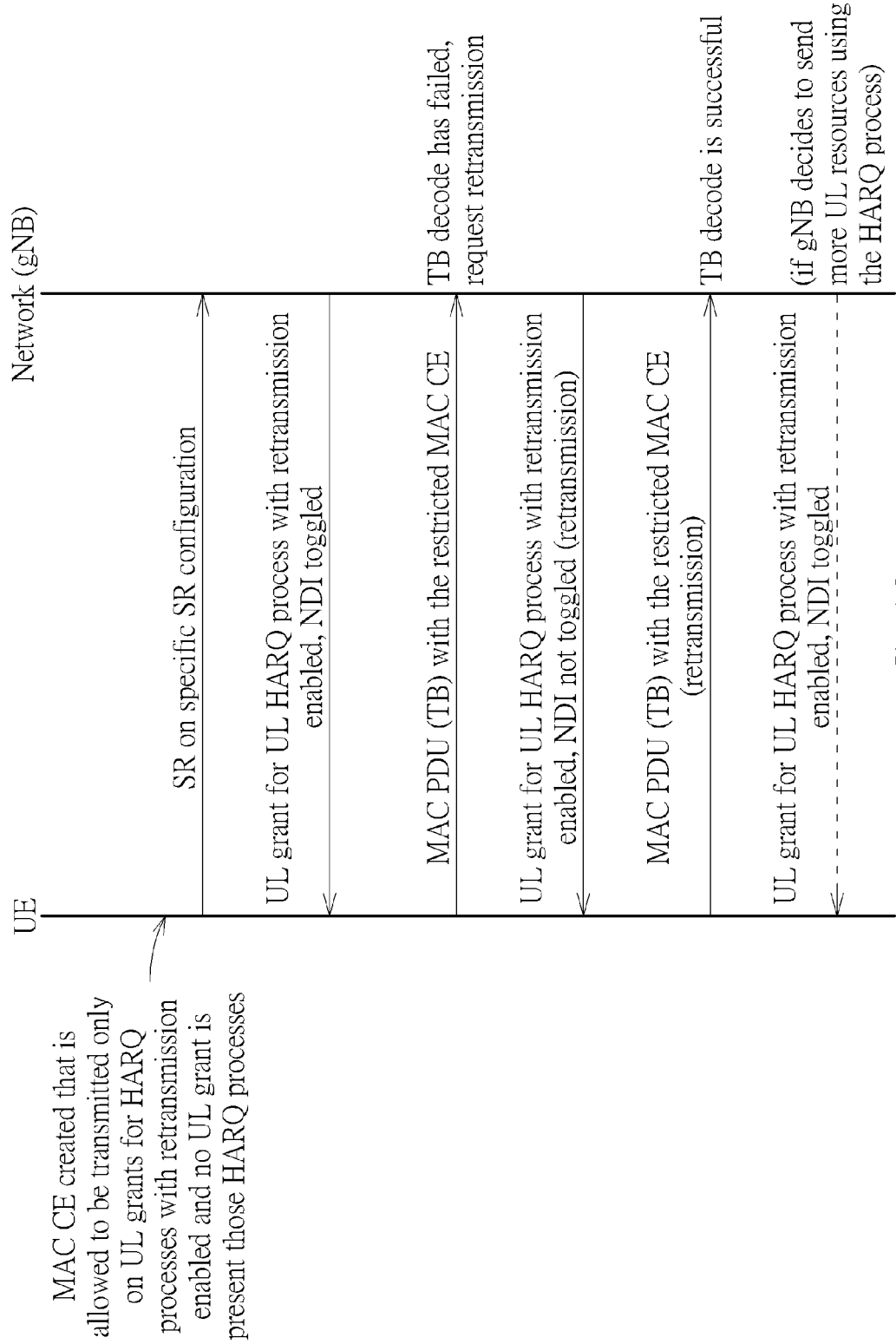
FIG. 12 illustrates an example message flow for triggering SR when no UL grant is present for a HARQ process with UL HARQ retransmission enabled in accordance with an implementation of the present disclosure.

FIG. 12 illustrates an example message flow for triggering SR when no UL grant is present for a HARQ process with UL HARQ retransmission enabled in accordance with an implementation of the present disclosure. When MAC CE that is allowed to be transmitted only on UL grants for HARQ processes with retransmission enabled (i.e. restricted MAC CE) is created and no UL grant for those HARQ processes is present, the processor 212 of communication apparatus 210 may transmit the SR on a specific SR configuration to the network apparatus 220, such as a gNB, in the network. In response to the SR, the network apparatus 220 may transmit an UL grant for the UL HARQ process with retransmission enabled accompanying with a new data indicator (NDI) toggled.

In response to the UL grant, the MAC layer protocol data unit (PDU) (e.g. a transport block (TB)) with the restricted MAC CE is transmitted by communication apparatus 210 to the network apparatus 220. Suppose that the TB decode has failed, retransmission is requested by the network apparatus 220 and the network apparatus 220 may transmit an UL grant for the UL HARQ process with retransmission enabled accompanying with the NDI not toggled (which means retransmission).

In response to the UL grant, the MAC layer PDU (TB) with the restricted MAC CE is retransmitted by communication apparatus 210 to the network apparatus 220. Suppose that the TB decode for the retransmission is successful, the network apparatus 220 may transmit an UL grant for the UL HARQ process with retransmission enabled accompanying with an NDI toggled if the network apparatus 220 decides to send more UL resources using the HARQ process.

In an embodiment of the present disclosure, when the SR cannot be sent (e.g. no SR configuration), the communication apparatus 210 may initiate a RACH and send a the MAC CE(s) in Msg3 (UL HARQ retransmission is expected to be always enabled for Msg3) or MsgA (MsgA can be retransmitted if MsgB is not successfully received within MsgB-ResponseWindow).

Figure 13:
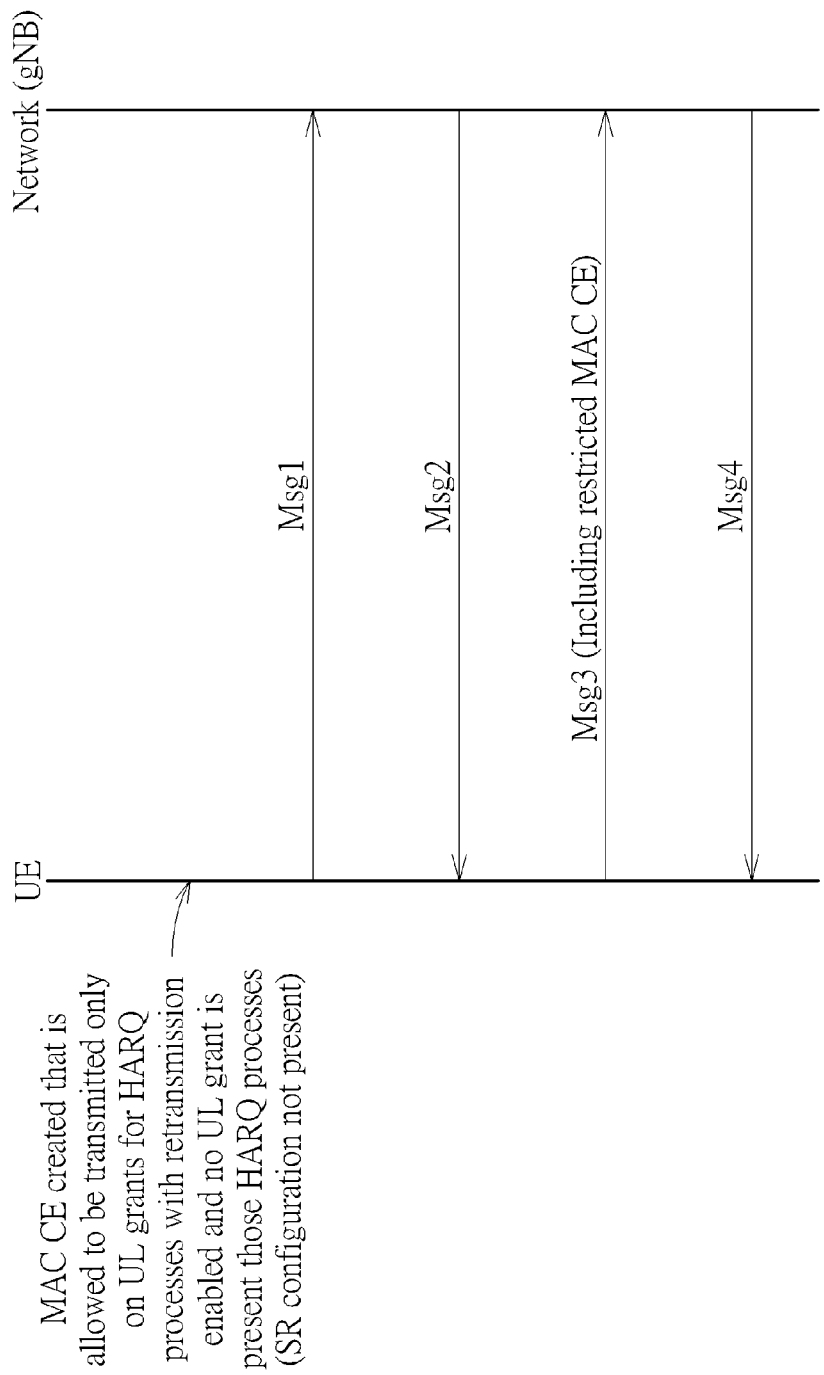
FIG. 13 illustrates an example message flow for triggering 4-step RA when no UL grant is present for a HARQ process with UL HARQ retransmission enabled in accordance with an implementation of the present disclosure.

FIG. 13 illustrates an example message flow for triggering 4-step RA when no UL grant is present for a HARQ process with UL HARQ retransmission enabled in accordance with an implementation of the present disclosure. When MAC CE that is allowed to be transmitted only on UL grants for HARQ processes with retransmission enabled (i.e. restricted MAC CE) is created and no UL grant for those HARQ processes is present and SR configuration is also not present, the communication apparatus 210 may carry the restricted MAC CE in message 3 (Msg3) in the 4-step RA.

Figure 14:
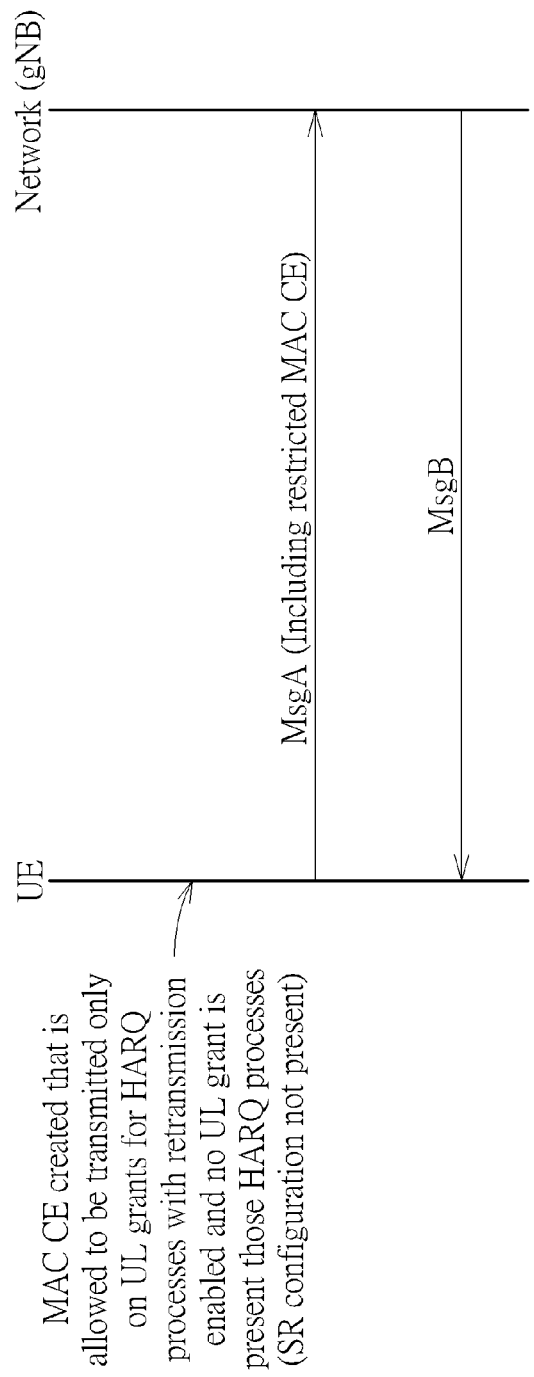
FIG. 14 illustrates an example message flow for triggering 2-step RA when no UL grant is present for a HARQ process with UL HARQ retransmission enabled in accordance with an implementation of the present disclosure.

FIG. 14 illustrates an example message flow for triggering 2-step RA when no UL grant is present for a HARQ process with UL HARQ retransmission enabled in accordance with an implementation of the present disclosure. When MAC CE that is allowed to be transmitted only on UL grants for HARQ processes with retransmission enabled (i.e. restricted MAC CE) is created and no UL grant for those HARQ processes is present and SR configuration is also not present, the communication apparatus 210 may carry the restricted MAC CE in message A (MsgA) in the 2-step RA.

Requesting Support for UL HARQ Retransmission Dynamically

In the third aspect accordance with an implementation of the present disclosure, new rules for requesting support for UL HARQ retransmission dynamically are proposed. In an embodiment of the present disclosure, the processor 212 of communication apparatus 210 may determining whether or not a transport block (TB) to be transmitted requires support for UL HARQ retransmission to obtain a determination result and indicate the determination result in Uplink Control Information (UCI). For example, the processor 212 of communication apparatus 210 may indicate in UCI that a specific transmission (such as a TB) requires support for UL HARQ retransmission (i.e. if it is not received successfully by the network), and providing the UCI to the network apparatus via the transceiver 216.

In an embodiment of the present disclosure, a new flag may be introduced and/or carried in the UCI to indicate that UL HARQ retransmission needs to be supported for an UL transmission. For example, Physical Uplink Control Channel (PUCCH) for the UCI could be multiplexed with the Physical Uplink Shared Channel (PUSCH) transmission.

In an embodiment of the present disclosure, the flag may be set based on, for example, the LCHs and MAC CEs multiplexed in the UL TB. If data from specific LCHs (for example, the aforementioned restricted LCH) or specific MAC CEs (for example, the aforementioned restricted MAC CEs) are included in the TB, the communication apparatus 210 may set the flag and indicate that UL HARQ retransmission needs to be supported for the TB. The set of LCHs and/or MAC CEs (that cause the flag to be set) may be configured by RRC signalling or by a DL MAC CE by the network apparatus 220, or fixed in the specifications.

In an embodiment of the present disclosure, one UL HARQ process may always be disabled for retransmission.

Figure 15:
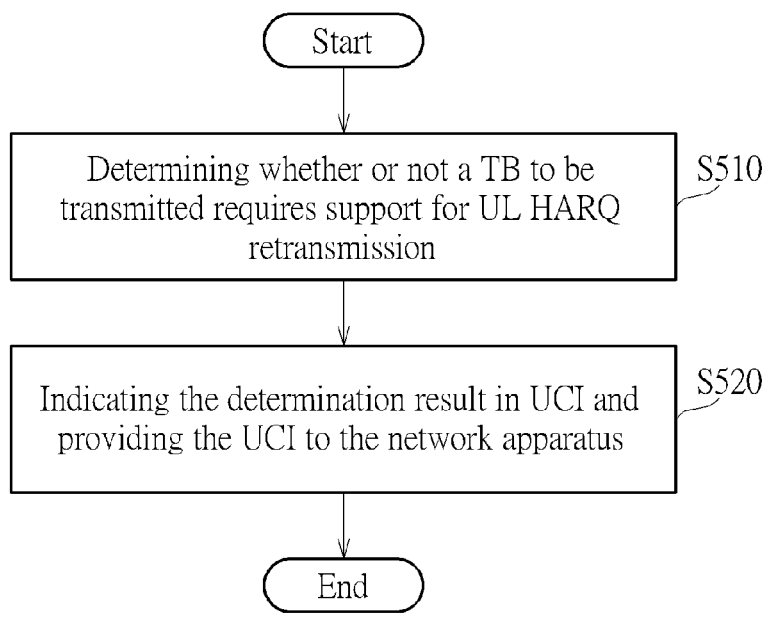
FIG. 15 illustrates an example process of a method for selectively enabling and disabling UL HARQ retransmission in NTN communications in accordance with an implementation in a third aspect of the present disclosure.

FIG. 15 illustrates an example process of a method for selectively enabling and disabling UL HARQ retransmission in NTN communications in accordance with an implementation in a third aspect of the present disclosure. The process may be an example implementation of schemes described above, whether partially or completely, with respect to selectively enabling and disabling UL HARQ retransmission in NTN communications in accordance with the present disclosure. The process may represent an aspect of implementation of features of communication apparatus 210. The process may include one or more operations, actions, or functions as illustrated by one or more of steps S510 and S520. Although illustrated as discrete steps, various steps of the process may be divided into additional steps, combined into fewer steps, or eliminated, depending on the desired implementation. Moreover, the steps of the process may be executed in the order shown in FIG. 15 or, alternatively, in a different order. The process may be implemented by communication apparatus 210 or any suitable UE or machine type devices, or implemented by network apparatus 220 or any suitable network node. Solely for illustrative purposes and without limitation, the process is described below in the context of communication apparatus 210 and network apparatus 220. The process may begin at step S510.

Step S510: determining whether or not a TB to be transmitted requires support for UL HARQ retransmission, and accordingly obtaining a determination result.

Step S520: indicating the determination result in UCI and providing the UCI to the network apparatus.

In an embodiment of the present disclosure, if the communication apparatus 210 has requested retransmission to be supported for a HARQ process and it receives further UL grants indicating new data (e.g. NDI toggled) for the same HARQ process, the communication apparatus 210 may skip the UL grant and optionally indicate, for example in UCI, that the UL transmission is skipped, or retransmit the TB (if the TB size is the same) and indicate that this is a retransmission, for example in UCI. For instance, when the determination result indicates that the TB to be transmitted requires support for UL HARQ retransmission, the processor 212 of communication apparatus 210 may skip a UL grant when the UL grant indicating new data for the specific HARQ process is received until an acknowledgement for the previously transmitted TB that required support for UL HARQ retransmission is received and indicate the skip of the UL grant in UCI and providing the UCI to the network apparatus 220 via the transceiver 216.

In an embodiment of the present disclosure, the communication apparatus 210 may wait for an UL grant for retransmission with an indication that this is for a previous TB for which UL HARQ retransmission support was requested, or an UL grant for new transmission with a distinct indication that the previous TB (for which UL HARQ retransmission support was requested) has been received successfully by the network apparatus, before transmitting new data using the UL grant.

Figure 16:
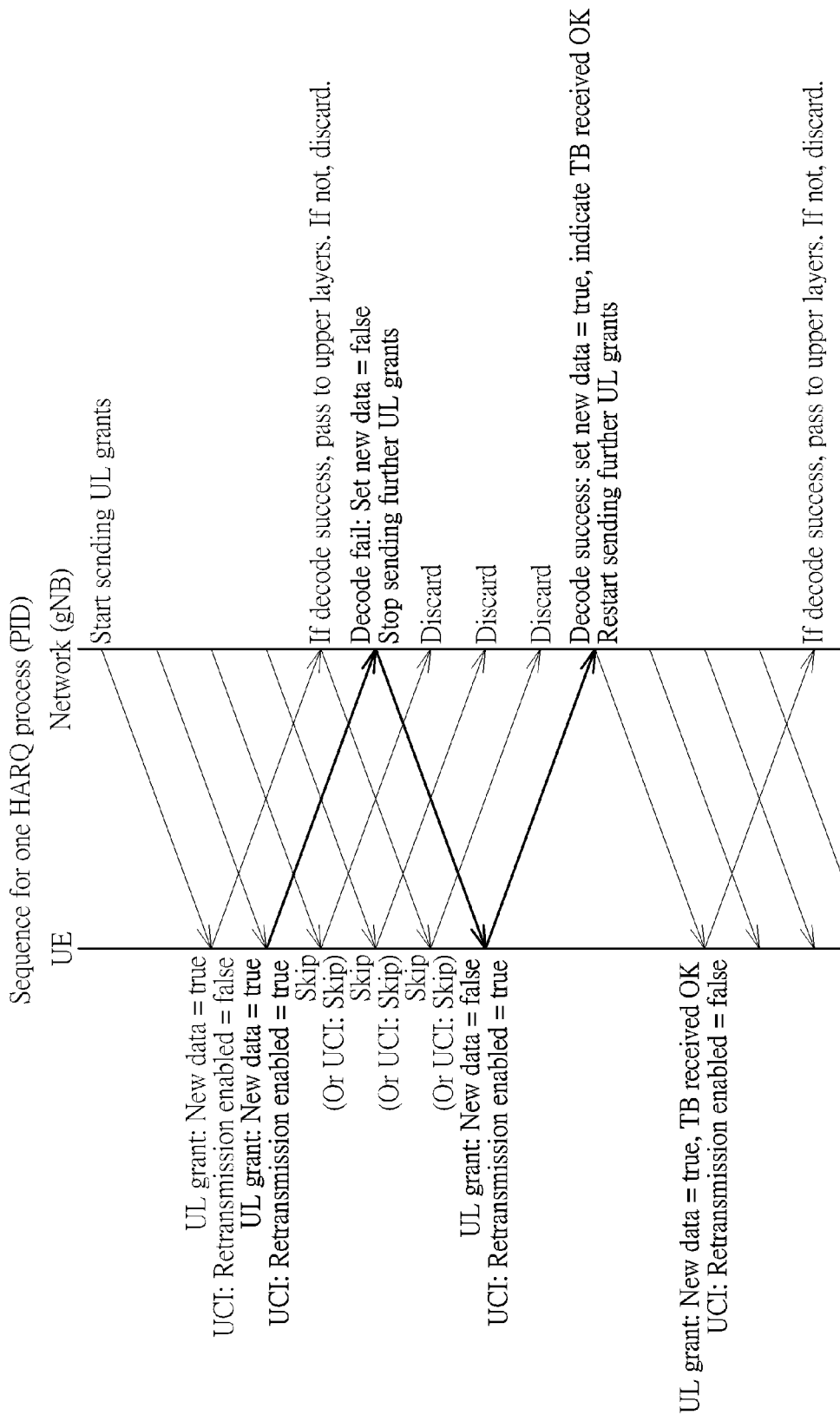
FIG. 16 illustrates an example message flow for requesting support for UL HARQ retransmission in UCI in accordance with an implementation of the present disclosure.

FIG. 16 illustrates an example message flow for requesting support for UL HARQ retransmission in UCI in accordance with an implementation of the present disclosure. In FIG. 16, the sequence of messages transmitted between the UE and the Network for one HARQ process is shown. The network apparatus 220 may start sending UL grants for one HARQ process in the beginning. In response to the UL grant, the communication apparatus 210 may indicate whether retransmission is required or enabled in UCI. When the retransmission is disabled (the "false" case) and when the decoding of data (e.g. a TB) is successful, the processor 222 of network apparatus 220 may pass the decoding result to upper layers. Otherwise, the TB may be discarded. When the retransmission is enabled (the "true" case) and when the decoding of data (e.g. a TB) is failed, the processor 222 of network apparatus 220 may send an UL grant for retransmission and stop sending further UL grants. When the UL grant indicating new data for the same HARQ process is received, the processor 212 of communication apparatus 210 may skip the UL grant and may further indicate the skip of the UL grant in UCI to the network apparatus 220 as shown in FIG. 16. The communication apparatus 210 may wait for an indication that decoding the retransmitted TB has been successful at the network apparatus 220. When the decoding of retransmitted TB is successful, the network apparatus 220 may restart sending further UL grants. Then, the communication apparatus 210 may receive an UL grant for new transmission with a distinct indication that the previous TB (for which UL HARQ retransmission support was requested) has been received successfully by the network apparatus.

In an alternative embodiment of the present disclosure, two separate HARQ buffers could be used for a single HARQ process in the communication apparatus 210 and the network. The first HARQ buffer is for transmission with retransmission enabled and the second HARQ buffer is for transmission with retransmission disabled. The communication apparatus 210 may continue using the HARQ process for transmissions with retransmission disabled even after sending a TB with retransmission enabled.

FIG. 17 illustrates an example message flow for requesting support for UL HARQ retransmission in UCI with two separate HARQ buffers in accordance with an implementation of the present disclosure. In FIG. 17, the sequence of messages transmitted between the UE and the Network for one HARQ process is shown. The network apparatus 220 may start sending UL grants and indicate any HARQ buffer in the beginning. In response to the UL grant, the communication apparatus 210 may indicate whether retransmission is required or enabled in UCI. When the retransmission is disabled (the "false" case), the HARQ buffer 1 is used and the data (e.g. a TB) received by the network apparatus 220 is placed in HARQ buffer 1. In addition, for the retransmission disabled case, when the decoding of the TB is successful, the processor 222 of network apparatus 220 may pass the decoding result to upper layers. Otherwise, the TB is discarded.

On the other hand, when the retransmission is enabled (the "true" case), the HARQ buffer 2 is used and the data received by the network apparatus 220 is placed in HARQ buffer 2. For the retransmission enabled case, when the decoding of the TB is failed, the processor 222 of network apparatus 220 may set the new data indicator to "false" in the UL grant and transmit the UL grant to the communication apparatus 210. When the decoding of the TB is successful, the processor 222 of network apparatus 220 may set the new data indicator to "true" in the UL grant and transmit the UL grant to the communication apparatus 210.

As another alternative embodiment of the present disclosure, the communication apparatus 210 may select the UL HARQ process (PID), if allowed by the network apparatus 220. The network apparatus 220 may indicate if the communication apparatus 210 is allowed to select the UL HARQ PID or not, e.g. in Downlink Control Information (DCI). The communication apparatus 210 may select a free UL HARQ process and indicate it, e.g. in UCI. The communication apparatus 210 may also indicate if UL HARQ retransmission needs to be supported, e.g. in UCI. When the communication apparatus 210 indicates that UL HARQ retransmission needs to be supported for a transmission on an UL HARQ process, that UL HARQ process may be blocked in the communication apparatus 210 since that UL HARQ process may be pending for the feedback from the network to indicate whether transmission of new data or retransmission of previous data is required. When the communication apparatus 210 does not indicate that UL HARQ retransmission needs to be supported for a transmission on a HARQ process, that HARQ process may be used for new data transmission immediately afterwards (i.e. not blocked in the communication apparatus 210).

Figure 18:
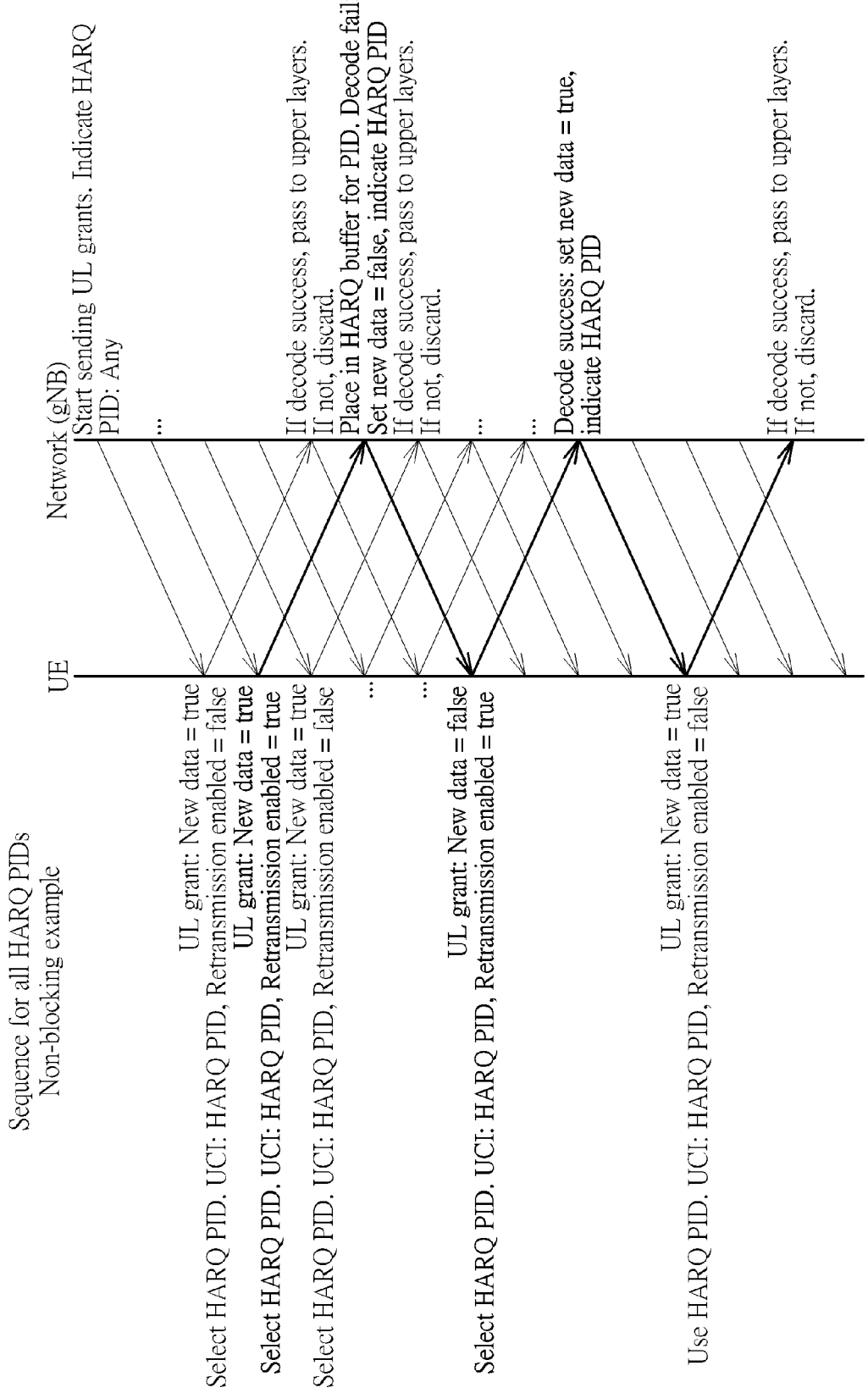
FIG. 18 illustrates an example message flow for requesting support for UL HARQ retransmission in UCI with selectable PID in accordance with an implementation of the present disclosure.

FIG. 18 illustrates an example message flow for requesting support for UL HARQ retransmission in UCI with selectable PID in accordance with an implementation of the present disclosure. In FIG. 18, the sequence of messages transmitted between the UE and the Network for all HARQ processes as a non-blocking example is shown. The network apparatus 220 may start sending UL grants and indicate any HARQ PID in the beginning. In response to the UL grant, the communication apparatus 210 may select the HARQ PID and indicate the selected PID and whether retransmission is required or enabled in UCI. The received TB is placed in the HARQ buffer for the selected PID. For the case when the retransmission is disabled (the "false" case) and when the decoding of the TB is successful, the processor 222 of network apparatus 220 may pass the decoding result to upper layers. Otherwise, the TB may be discarded.

On the other hand, for the case when the retransmission is enabled (the "true" case) and when the decoding of the TB is failed, the processor 222 of network apparatus 220 may set the new data indicator to "false" in the UL grant and transmit the UL grant to the communication apparatus 210. The HARQ PID may be also indicated by the network apparatus 220. When the decoding of the TB is successful, the processor 222 of network apparatus 220 may set the new data indicator to "true" in the UL grant and transmit the UL grant to the communication apparatus 210. The HARQ PID may be also indicated by the network apparatus 220.

Figure 19:
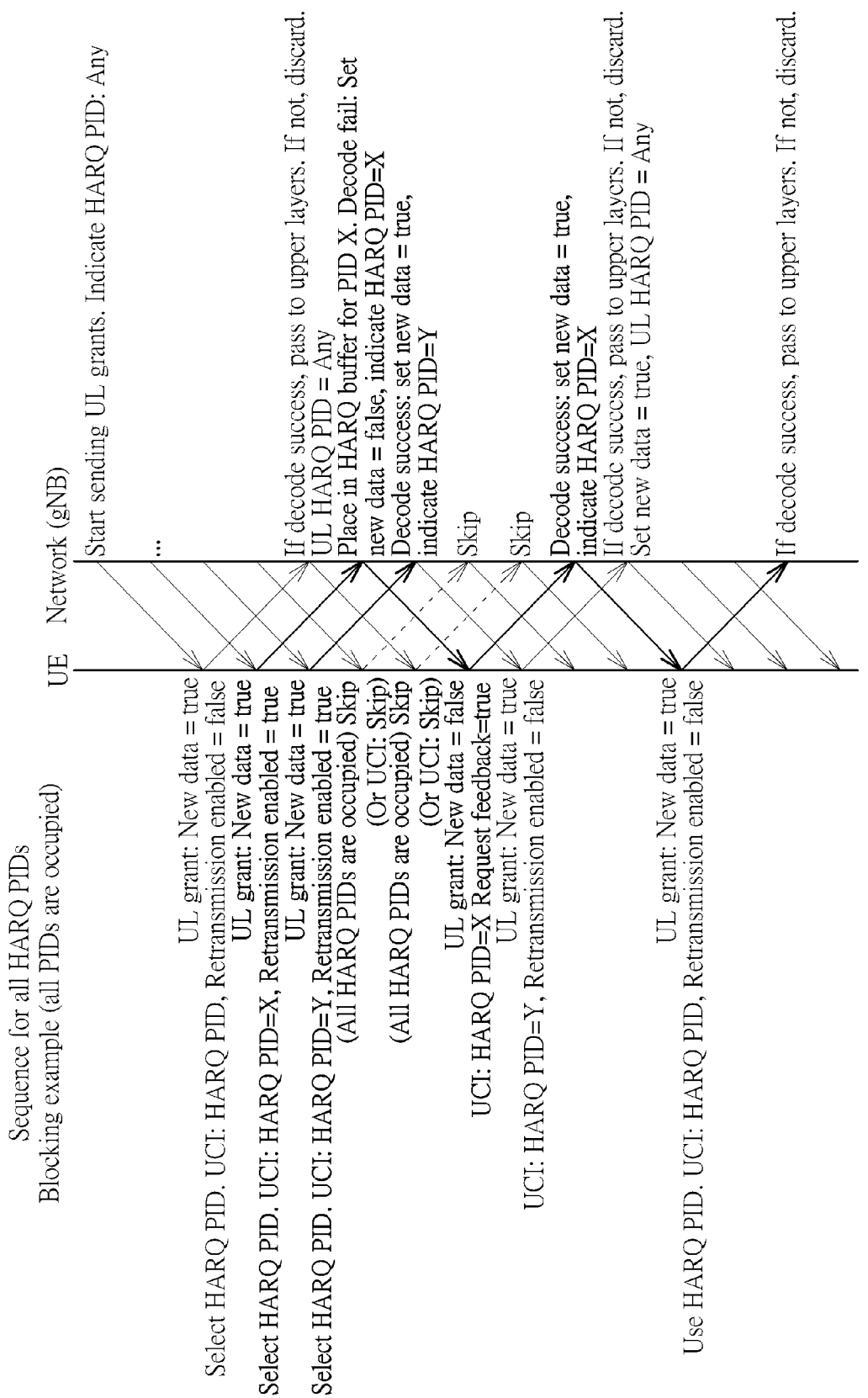
FIG. 19 illustrates another example message flow for requesting support for UL HARQ retransmission in UCI with selectable PID in accordance with an implementation of the present disclosure.

FIG. 19 illustrates another example message flow for requesting support for UL HARQ retransmission in UCI with selectable PID in accordance with an implementation of the present disclosure. In FIG. 19, the sequence of messages transmitted between the UE and the Network for all HARQ processes as a blocking example is shown. In the example shown in FIG. 19, all PIDs are occupied since the communication apparatus 210 is requesting and waiting for feedback from the network device 220 for the HARQ with PID=X.

In an embodiment of the present disclosure, if all HARQ processes are blocked in the communication apparatus 210, and the communication apparatus 210 receives further UL grants with "allowed to select UL HARQ PID" indication from the network, the communication apparatus 210 may skip the UL grants, and optionally indicate the skipping in UCI. When the communication apparatus 210 receives an UL grant for retransmission for a blocked HARQ process, it may retransmit the TB. When the communication apparatus 210 receives an UL grant for a blocked HARQ process for new transmission and an indication that the previous TB has been received successfully, the communication apparatus 210 may unblock the HARQ process and transmit new data (if available).

In yet some other aspect accordance with an implementation of the present disclosure, UL HARQ feedback for MSG4/MSGB transmission may be always enabled, regardless of whether or not the HARQ process used for Msg4/MsgB was disabled for UL HARQ feedback (e.g. by RRC configuration), because it is a specific function in MAC for random access procedure, which is signaled to the NW for indicating the success completion for random access procedure.

With the proposed solutions or schemes pertain to selectively enabling and disabling UL HARQ retransmission in NTN communications, the aforementioned transmission overhead issues can be solved.

Detailed embodiments and implementations have been described above in the specification and thus are omitted here for brevity. Reference may be made to the above sections.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for selectively enabling and disabling uplink (UL) Hybrid Automatic Repeat request (HARQ) retransmission in Non-Terrestrial Network (NTN) communications, comprising:
   determining a set of logical channels that are allowed to transmit using one or more specific UL HARQ processes,
   wherein the one or more specific UL HARQ processes comprise one or more UL HARQ processes for which the UL retransmission has been disabled or one or more UL HARQ processes for which the UL retransmission has been enabled;
   wherein a mapping between the set of logical channels and the one or more specific UL HARQ processes is indicated by a RRC configuration.

2. The method of claim 1, wherein the determination is performed by a communication apparatus communicating with a network apparatus, and the method further comprises:
   when UL data arrives for at least one logical channel in the set of logical channels, using at least one of the one or more specific UL HARQ processes to transmit the UL data,
   wherein the set of logical channels that are allowed to transmit using the one or more specific UL HARQ processes is determined based on a configuration provided by the network apparatus via RRC signaling.

3. The method of claim 1, wherein the determination is performed by a communication apparatus communicating with a network apparatus, and the method further comprises:
   when UL data arrives for at least one logical channel in the set of logical channels, using at least one of the one or more specific UL HARQ processes to transmit the UL data,
   wherein the set of logical channels that are allowed to transmit using the one or more specific UL HARQ processes is determined based on a configuration provided by the network apparatus via downlink (DL) Medium Access Control (MAC) Control Element (CE).

4. The method of claim 1, wherein the set of logical channels that are allowed to transmit using the one or more specific UL HARQ processes is determined based on Radio Link Control (RLC) mode of operations or a type of radio bearer data.

5. The method of claim 1, wherein the determination is performed by a network apparatus communicating with a communication apparatus and the method further comprises:
   providing a configuration of the set of logical channels that are allowed to transmit using the one or more specific UL HARQ processes to the communication apparatus by RRC signaling.

6. The method of claim 1, wherein the determination is performed by a network apparatus communicating with a communication apparatus and the method further comprises:
   providing a configuration of the set of logical channels that are allowed to transmit using the one or more specific UL HARQ processes to the communication apparatus by a MAC CE.

7. A method for selectively enabling and disabling uplink (UL) Hybrid Automatic Repeat request (HARQ) retransmission in Non-Terrestrial Network (NTN) communications, comprising:

determining a set of Medium Access Control (MAC) Control Elements (CEs) that are allowed to be transmitted using one or more specific UL HARQ processes, wherein the one or more specific UL HARQ processes comprise one or more UL HARQ processes for which the UL retransmission has been disabled or one or more UL HARQ processes for which the UL retransmission has been enabled;

wherein a mapping between the set of MAC CEs and the one or more specific UL HARQ processes is indicated by a RRC configuration.

8. The method of claim 7, wherein the determination is performed by a communication apparatus communicating with a network apparatus, and the method further comprises:

when a transport block (TB) that includes a MAC CE belonging to the set of MAC CEs is to be transmitted, using at least one of the one or more specific UL HARQ processes to transmit the TB, wherein the set of MAC CEs that are allowed to be transmitted using the one or more specific UL HARQ processes is determined based on a configuration provided by the network apparatus via RRC signaling.

9. The method of claim 7, wherein the determination is performed by a communication apparatus communicating with a network apparatus, and the method further comprises:

when a transport block (TB) that includes a MAC CE belonging to the set of MAC CEs is to be transmitted, using at least one of the one or more specific UL HARQ processes to transmit the TB, wherein the set of MAC CEs that are allowed to be transmitted using the one or more specific UL HARQ processes is determined based on a configuration provided by the network apparatus via downlink (DL) Medium Access Control (MAC) Control Element (CE).

10. The method of claim 7, wherein the set of MAC CEs that are allowed to be transmitted using the one or more specific UL HARQ processes is determined based on priorities of the MAC CEs.

11. The method of claim 7, wherein the determination is performed by a network apparatus communicating with a communication apparatus and the method further comprises:

providing a configuration of the set of MAC CEs that are allowed to be transmitted using the one or more specific UL HARQ processes to the communication apparatus by RRC signaling.

12. The method of claim 7, wherein the determination is performed by a network apparatus communicating with a communication apparatus and the method further comprises:

providing a configuration of the set of MAC CEs that are allowed to be transmitted using the one or more specific UL HARQ processes to the communication apparatus by a MAC CE.

13. A method for selectively enabling and disabling uplink (UL) Hybrid Automatic Repeat request (HARQ) retransmission in Non-Terrestrial Network (NTN) communications, comprising:

determining whether or not a transport block (TB) to be transmitted requires support for UL Hybrid Automatic Repeat request (HARQ) retransmission to obtain a determination result; and indicating the determination result in a first Uplink Control Information (UCI) and providing the first UCI to a network apparatus.

14. The method of claim 13, wherein the determination is performed based on whether data from a specific logical channel or a specific Medium Access Control (MAC) Control Element (CE) that requires support for UL HARQ retransmission is included in the TB.

15. The method of claim 13, wherein when the determination result indicates that the TB to be transmitted requires support for UL HARQ retransmission, the method further comprises:

skipping an UL grant when the UL grant indicates new data for the specific HARQ process until an acknowledgement for the successful reception of the TB is received; and indicating skip of the UL grant in a second UCI and providing the second UCI to the network apparatus via the transceiver.

16. The method of claim 13, wherein a flag which indicates whether UL HARQ retransmission needs to be supported for an UL transmission is carried in the first UCI.

* * * * *